(12) United States Patent
Shiino

(10) Patent No.: US 12,462,382 B2
(45) Date of Patent: Nov. 4, 2025

(54) DIAGNOSIS ASSISTANCE DEVICE, MACHINE LEARNING DEVICE, DIAGNOSIS ASSISTANCE METHOD, MACHINE LEARNING METHOD, MACHINE LEARNING PROGRAM, AND ALZHEIMER'S PREDICTION PROGRAM

(71) Applicants: NATIONAL UNIVERSITY CORPORATION SHIGA UNIVERSITY OF MEDICAL SCIENCE, Otsu (JP); ERISA CO., LTD., Matsue (JP)

(72) Inventor: Akihiko Shiino, Otsu (JP)

(73) Assignees: NATIONAL UNIVERSITY CORPORATION SHIGA UNIVERSITY OF MEDICAL SCIENCE, Otsu (JP); ERISA CO., LTD., Matsue (JP)

(*) Notice: Subject to any disclaimer, the term of this patent is extended or adjusted under 35 U.S.C. 154(b) by 435 days.

(21) Appl. No.: 17/920,396

(22) PCT Filed: Apr. 22, 2021

(86) PCT No.: PCT/JP2021/016283
§ 371 (c)(1),
(2) Date: Oct. 21, 2022

(87) PCT Pub. No.: WO2021/215494
PCT Pub. Date: Oct. 28, 2021

(65) Prior Publication Data
US 2023/0162351 A1 May 25, 2023

(30) Foreign Application Priority Data
Apr. 23, 2020 (JP) ................ 2020-076563

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 7/62* (2017.01); *G16H 50/20* (2018.01);
(Continued)

(58) Field of Classification Search
CPC . G06T 7/0012; G06T 7/11; G06T 7/62; G06T 2207/10088; G06T 2207/20081;
(Continued)

(56) References Cited

U.S. PATENT DOCUMENTS

2014/0341471 A1    11/2014  Ono et al.
2018/0199815 A1*    7/2018  Redei ............... G16H 15/00
2021/0228079 A1*    7/2021  Betrouni ........... G16H 50/30

FOREIGN PATENT DOCUMENTS

JP    2019187966 A    10/2019
WO   2013047278 A     4/2013

OTHER PUBLICATIONS

International Search Report for International Application No. PCT/JP2021/016283 dated Jul. 20, 2021, 4 pages Including English Translation.

* cited by examiner

*Primary Examiner* — Neil R McLean
(74) *Attorney, Agent, or Firm* — MH2 Technology Law Group, LLP

(57) ABSTRACT

The possibility that an ADNC patient will develop Alzheimer's disease is predicted with high accuracy. A diagnosis assistance device 2 predicts a possibility that a subject who has ADNC will develop Alzheimer's disease within a pre- (Continued)

scribed period, the diagnosis assistance device 2 comprising a prediction unit 23 that predicts the possibility that the subject will develop Alzheimer's disease within a prescribed period, according to a machine-learned prediction algorithm D4.

17 Claims, 12 Drawing Sheets

(51) Int. Cl.
*G06T 7/62* (2017.01)
*G16H 50/20* (2018.01)

(52) U.S. Cl.
CPC ............... *G06T 2207/10088* (2013.01); *G06T 2207/20081* (2013.01); *G06T 2207/30016* (2013.01)

(58) Field of Classification Search
CPC . G06T 2207/30016; G06T 7/12; G16H 50/20; G16H 10/40; G16H 20/00; G16H 30/40; G16H 50/30; G16H 50/70; G16H 30/20; A61B 5/055
USPC ......................................................... 382/128
See application file for complete search history.

(a)

(b)

DIAGNOSIS ASSISTANCE DEVICE, MACHINE LEARNING DEVICE, DIAGNOSIS ASSISTANCE METHOD, MACHINE LEARNING METHOD, MACHINE LEARNING PROGRAM, AND ALZHEIMER'S PREDICTION PROGRAM

CROSS-REFERENCE TO RELATED APPLICATIONS

This application is a U.S. National Stage application of Int'l. Application No. PCT/JP2021/016283 filed 22 Apr. 2021, which claims priority to Japanese Application No. 2020-076563 filed 23 Apr. 2020, the entire disclosures of which are hereby incorporated by reference in their entireties.

TECHNICAL FIELD

The present invention relates to a technique for predicting if patients who have Alzheimer's disease neuropathologic change (ADNC) will develop Alzheimer's disease within a prescribed period, and particularly relates to a prediction technique using artificial intelligence.

BACKGROUND ART

For the treatment of Alzheimer's disease (AD), it is necessary to develop early diagnosis techniques, preferably before onset. In response to this necessity, VSRAD (registered trademark) (voxel-based specific regional analysis system for Alzheimer's disease) has been developed (PTL 1) as an early AD (Alzheimer's disease) diagnosis assistance system. VSRAD (registered trademark) is image processing and statistical analysis software for reading the degree of atrophy around the parahippocampal gyrus, which is characteristic of early AD, including the prodromal period, from MRI images. Further, the present inventor has developed a technique for predicting whether patients with mild cognitive impairment (MCI), which is considered to be a preliminary stage of Alzheimer's disease, have progressive pMCI, which will progress to Alzheimer's disease (progressive MCI) or stable sMCI, which will not progress to Alzheimer's disease (stable MCI) (PTL 2).

MCI is a concept of the boundary region between healthy subjects (NL) and Alzheimer's disease; however, according to recent guidelines, it is not recommended to set a cutoff value for any test. That is, it is difficult to clearly distinguish between healthy subjects and MCI, and between MCI and Alzheimer's disease.

On the other hand, in recent years, in order to predict the onset of Alzheimer's disease, detection of Alzheimer's disease neuropathologic change (ADNC) has been conducted by in-vivo pathological diagnosis. ADNC is identified by two positive findings: deposition of senile plaques (amyloid-β) and neurofibrillary tangles (tau degeneration). At present, amyloid-β deposition and tau degeneration can be detected by spinal fluid tests. In the future, it is expected that blood tests will also be able to detect amyloid-β accumulation and tau degeneration, and amyloid PET and tau PET have been developed. Thus, it is now possible to clearly identify whether patients have ADNC. From the viewpoint of early treatment, the diagnosis of ADNC is expected to become more important than clinical diagnosis in the future.

In addition, development of disease-modifying therapies (DMTs), such as reducing amyloid-β accumulation, is underway. For example, in the fall of 2019, aducanumab, developed by Biogen and Eisai, was reported to inhibit the progression of MCI and early Alzheimer's disease.

CITATION LIST

Patent Literature

PTL 1: WO2013/047278
PTL 2: JP6483890B

SUMMARY OF INVENTION

Technical Problem

It is also known that some patients diagnosed as having ADNC do not always develop Alzheimer's disease. Therefore, it is not appropriate to target all ADNC patients for DMT. At present, it has not been clarified for which patients and what timing DMT should be performed.

Accordingly, an object of the present invention is to predict, with high accuracy, the possibility that ADNC patients will develop Alzheimer's disease within a prescribed period.

Solution to Problem

The present invention includes the following aspects.
Item 1.
A diagnosis assistance device predicting a possibility that a subject who has Alzheimer's disease neuropathologic change will develop Alzheimer's disease within a prescribed period,
  the diagnosis assistance device comprising a prediction unit that predicts the possibility according to a machine-learned prediction algorithm.
Item 2.
The diagnosis assistance device according to Item 1, further comprising:
  a region segmentation unit that segments a brain image acquired from the subject into gray matter, white matter, and a spinal fluid part, and separates the lateral ventricle from the spinal fluid part;
  a region-of-interest setting unit that sets multiple regions of interest in each of the gray matter, the white matter, and the lateral ventricle;
  a t-value and p-value calculation unit that calculates t- and p-values in each region of interest for the volume of each region of interest; and
  a z-value calculation unit that calculates a z-value of each region of interest based on the t- and p-values,
  wherein the prediction unit predicts the possibility based on the z-values.
Item 3.
The diagnosis assistance device according to Item 2, wherein the region segmentation unit determines a boundary between the corpus callosum and surrounding white matter by surface tension and viscosity parameters of a fluid to thereby separate the surrounding white matter.
Item 4.
The diagnosis assistance device according to Item 2 or 3, wherein when a white matter lesion is present in the white matter, the region-of-interest setting unit extracts the white matter lesion, replaces it with an average signal value of the white matter of the subject, and then sets the regions of interest in the white matter.

Item 5.

The diagnosis assistance device according to Item 1, further comprising:
  a region separation unit that separates gray matter from a brain image acquired from the subject;
  a region-of-interest setting unit that sets multiple regions of interest in the gray matter;
  a volume calculation unit that calculates the volume of each region of interest; and
  a z-value calculation unit that calculates a z-value of each region of interest based on the volume,
  wherein the prediction unit predicts the possibility based on the z-values.

Item 6.

The diagnosis assistance device according to Item 5, further comprising a covariate correction unit that performs covariate correction on the volume.

Item 7.

The diagnosis assistance device according to any one of Items 2 to 6, wherein the prediction unit predicts the possibility as a posterior probability from the distance to a hyperplane by a sigmoid function.

Item 8.

A machine learning device learning the prediction algorithm according to any one of Items 1 to 7,
  the machine learning device comprising a learning unit that learns the prediction algorithm based on teacher data generated from brain images of multiple persons, and diagnosis results indicating whether each person has developed Alzheimer's disease before the end of the prescribed period from the acquisition of the brain image.

Item 9.

The machine learning device according to Item 8, wherein the learning unit is configured from a support vector machine.

Item 10.

The machine learning device according to Item 8 or 9, wherein the brain images are MRI images.

Item 11.

The machine learning device according to any one of Items 8 to 10, further comprising a teacher data generation unit that generates the teacher data based on the brain images of multiple persons and the diagnosis results indicating whether each person has developed Alzheimer's disease before the end of the prescribed period from the acquisition of the brain image.

Item 12.

The machine learning device according to Item 11, wherein the teacher data generation unit comprises:
  a region segmentation unit that segments each of the brain images acquired from the persons into gray matter, white matter, and a spinal fluid part, and separates the lateral ventricle from the spinal fluid part;
  a region-of-interest setting unit that sets multiple regions of interest in each of the gray matter, the white matter, and the lateral ventricle;
  a t-value and p-value calculation unit that calculates t- and p-values in each region of interest for the volume of each region of interest; and
  a z-value calculation unit that calculates a z-value of each region of interest based on the t- and p-values,
  wherein the teacher data includes the diagnosis results and the z-values.

Item 13.

The machine learning device according to Item 11, wherein the teacher data generation unit comprises:
  a region separation unit that separates gray matter from each of the brain images acquired from the persons;
  a region-of-interest setting unit that sets multiple regions of interest in the gray matter;
  a volume calculation unit that calculates the volume of each region of interest; and
  a z-value calculation unit that calculates a z-value of each region of interest based on the volume,
  wherein the teacher data includes the diagnosis results and the z-values.

Item 14.

The machine learning device according to Item 13, further comprising a covariate correction unit that performs covariate correction on the volume.

Item 15.

A diagnosis assistance method predicting a possibility that a subject who has Alzheimer's disease neuropathologic change will develop Alzheimer's disease within a prescribed period, the method comprising a prediction step of predicting the possibility according to a machine-learned prediction algorithm.

Item 16.

A machine learning method learning the prediction algorithm according to Item 12, the method comprising a learning step of learning the prediction algorithm based on teacher data generated from brain images of multiple persons and diagnosis results indicating whether each person has developed Alzheimer's disease before the end of the prescribed period from the acquisition of the brain image.

Item 17.

A machine learning program causing a computer to learn the prediction algorithm according to Item 15, wherein the machine learning program causes the computer to execute a learning step of learning the prediction algorithm based on teacher data generated from brain images of multiple persons and diagnosis results indicating whether each person has developed Alzheimer's disease before the end of the prescribed period from the acquisition of the brain image.

Item 18.

An Alzheimer's prediction program causing a computer to execute:
  a teacher data generation step of generating teacher data from brain images of multiple persons and diagnosis results indicating whether each person has developed Alzheimer's disease before the end of a prescribed period from the acquisition of the brain image,
  a learning step of learning a prediction algorithm based on the teacher data, and
  a prediction step of predicting, according to the prediction algorithm, a possibility that a subject who has Alzheimer's disease neuropathologic change will develop Alzheimer's disease within the prescribed period;
wherein the teacher data generation step comprises:
  separating gray matter from the brain images acquired from the persons,
  setting multiple regions of interest in the gray matter,
  calculating the volume of each region of interest,
  calculating a z-value of each region of interest based on the volume, and
  associating the diagnosis results with the z-values to generate the teacher data; and wherein the prediction step comprises:
  separating gray matter from a brain image acquired from the subject,
  setting multiple regions of interest in the gray matter,
  calculating the volume of each region of interest, calculating a z-value of each region of interest based on the volume, and
predicting the possibility based on the z-values.

Advantageous Effects of Invention

According to the present invention, the possibility that ADNC patients will develop Alzheimer's disease can be predicted with high accuracy.

DESCRIPTION OF EMBODIMENTS

First Embodiment

Figure 1:
FIG. 1 is a block diagram showing a schematic structure of a prediction system according to a first embodiment of the present invention.

A first embodiment of the present invention is described below with reference to the attached drawings. The present invention is not limited to the following embodiment.
Entire Structure FIG. 1 is a block diagram showing a schematic structure of a prediction system 100 according to the present embodiment. The prediction system 100 comprises a machine learning device 1 and a diagnosis assistance device 2. The machine learning device 1 learns a prediction algorithm for predicting the possibility that a subject who has Alzheimer's disease neuropathologic change (ADNC) (hereinafter referred to as "ADNC subject") will develop Alzheimer's disease within a prescribed period. The diagnosis assistance device 2 predicts the possibility that the ADNC subject will develop Alzheimer's disease within a prescribed period, according to the prediction algorithm learned by the machine learning device 1. The machine learning device 1 and the diagnosis assistance device 2 may be achieved as separate devices, or the machine learning device 1 and the diagnosis assistance device 2 may be configured as a single device.

Figure 2:
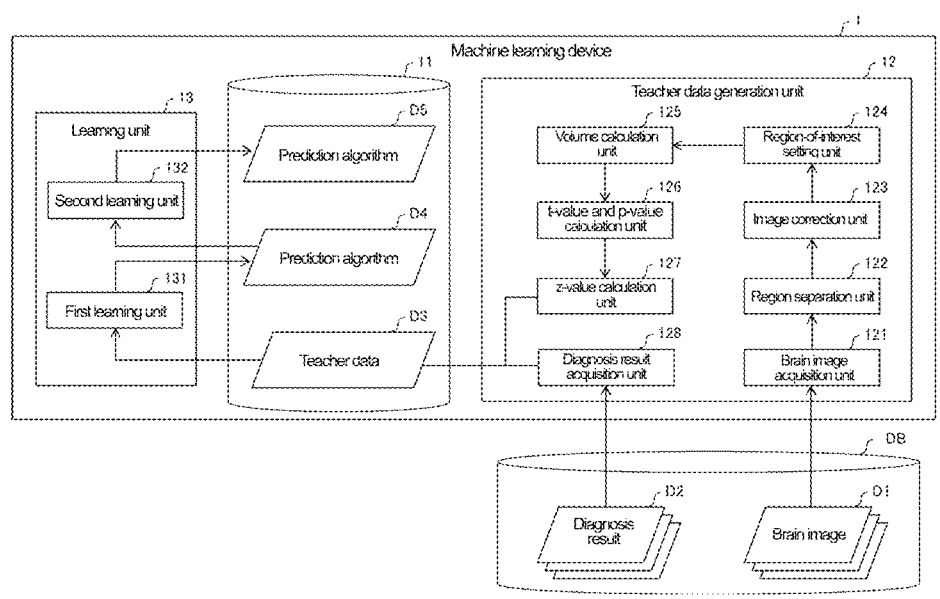
FIG. 2 is a block diagram showing the function of a machine learning device according to the first embodiment of the present invention.

Configuration examples of the machine learning device 1 and diagnosis assistance device 2 are described below.
Machine Learning Device FIG. 2 is a block diagram showing the function of the machine learning device 1 according to the present embodiment. The machine learning device 1 can be configured, for example, from a general-purpose personal computer, and comprises CPU (not shown), a main storage device (not shown), an auxiliary storage device 11, and the like as hardware configurations. In the machine learning device 1, the CPU reads out various programs stored in the auxiliary storage device 11 to the main storage device and executes them, thereby executing various kinds of arithmetic processing. The auxiliary storage device 11 can be configured, for example, from a hard disk drive (HDD) or a solid-state drive (SSD). Further, the auxiliary storage device 11 may be built into the machine learning device 1, or may be provided as an external storage device separate from the machine learning device 1.

The machine learning device 1 has the function of learning a prediction algorithm D4 for predicting the possibility that an ADNC subject will develop Alzheimer's disease within a prescribed period (e.g., within 5 years). ADNC patients are classified into the following groups:
  patients who have already developed Alzheimer's disease (AD),
  progressive mild cognitive impairment patients who will develop Alzheimer's disease within a prescribed period (pMCI), and
  stable mild cognitive impairment patients who will not develop Alzheimer's disease in the future (sMCI).
In the present embodiment, among ADNC patients, AD and pMCI are referred to as "ADNC spectrum." That is, the machine learning device 1 has the function of learning prediction algorithms D4 and D5 for predicting the possibility that an ADNC subject is ADNC spectrum.

In order to achieve this function, the machine learning device 1 comprises a teacher data generation unit 12 and a learning unit 13 as function blocks. The teacher data generation unit 12 is a function block that generates teacher data D3 from brain images D1 and diagnosis results D2 of multiple persons. The multiple persons are preferably, but are not limited to, patients who have been diagnosed as having ADNC, and may include persons who have been diagnosed as having mild cognitive impairment and healthy subjects. The learning unit 13 is a function block that learns the prediction algorithms D4 and D5 based on the teacher data D3. The teacher data generation unit 12 and the learning unit 13 are achieved by executing machine learning programs stored in the auxiliary storage device 11.

The machine learning device 1 is accessible to a diagnosis information database DB. The diagnosis information database DB stores brain images D1 of multiple persons, and diagnosis results D2 indicating whether each person is ADNC spectrum. The diagnosis results D2 indicate whether each parson has developed Alzheimer's disease before the end of the prescribed period from the acquisition of the brain image D1. The phrase "before the end of the prescribed period from the acquisition of the brain image D1" may include not only a time period from the acquisition of the brain image D1 to the end of the prescribed period, but also a time period before the acquisition of the brain image D1. That is, the diagnosis results D2 may include only diagnosis results indicating whether each person has developed AD from the acquisition of the brain image D1 to the end of the prescribed period, and may further contain diagnosis results indicating whether each person has developed AD at the time of acquisition of the brain image D1.

In the present embodiment, the brain images D1 are three-dimensional MRI images. It is desirable to prepare at least certain numbers of the brain images D1 and the diagnosis results D2 available to obtain a statistical significance for each of a target group of Alzheimer's disease patients, a target group of patients reaching Alzheimer's disease, and a target group of patients not reaching Alzheimer's disease. The diagnosis information database DB may be owned by one medical institution or shared by multiple medical institutions.

The teacher data generation unit 12 comprises, as function blocks for generating the teacher data D3, a brain image acquisition unit 121, a region segmentation unit 122, an image correction unit 123, a region-of-interest setting unit 124, a volume calculation unit 125, a t-value and p-value calculation unit 126, a z-value calculation unit 127, and a diagnosis result acquisition unit 128.

The brain image acquisition unit 121 acquires a brain image D1 from the diagnosis information database DB. The region segmentation unit 122 to the z-value calculation unit 127 set multiple regions of interest (ROI) in the brain region for the acquired brain image D1, and perform arithmetic processing, such as calculation of the z-value of each region of interest. The specific details of the arithmetic processing performed by each of the region segmentation unit 122 to the z-value calculation unit 127 are described later.

The diagnosis result acquisition unit 128 acquires the diagnosis result D2 of each person, whose brain image D1 has been acquired, from the diagnosis information database DB. The teacher data generation unit 12 associates the z-value of each region of interest with the diagnosis result D2 for each person to generate teacher data D3, and stores the data in the auxiliary storage device 11.

The learning unit 13 comprises a first learning unit 131 and a second learning unit 132. The first learning unit 131 learns a prediction algorithm D4 based on the teacher data D3, and stores the learned prediction algorithm D4 in the auxiliary storage device 11. The second learning unit 132 further learns the prediction algorithm D4, and stores a learned prediction algorithm D5 in the auxiliary storage device 11. The machine learning method is not particularly limited; however, in the present embodiment, the first learning unit 131 and the second learning unit 132 are configured from support vector machines.

Machine Learning Method

Figure 3:
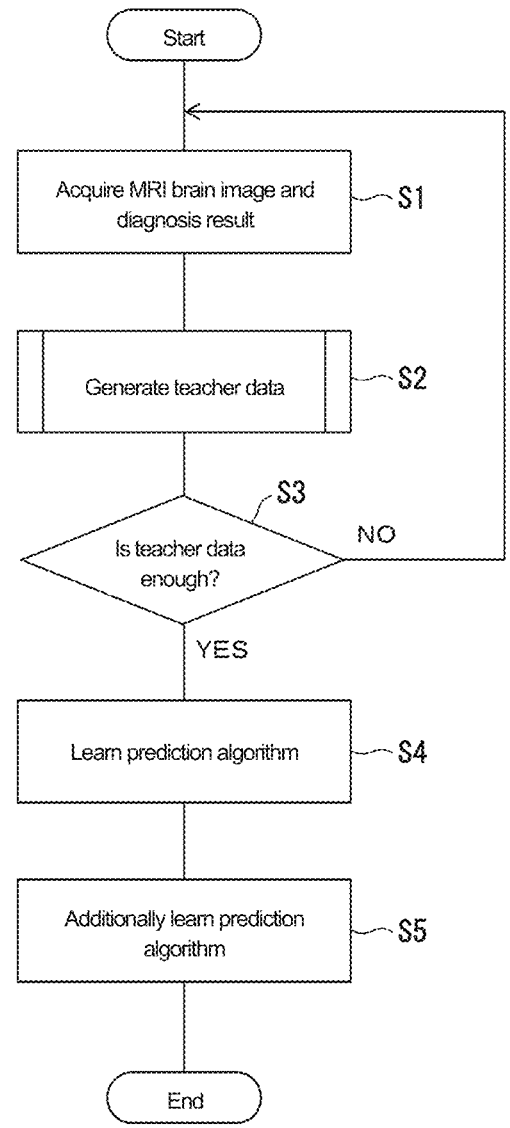
FIG. 3 is a flowchart showing the entire procedure of a machine learning method according to the first embodiment of the present invention.
Figure 4:
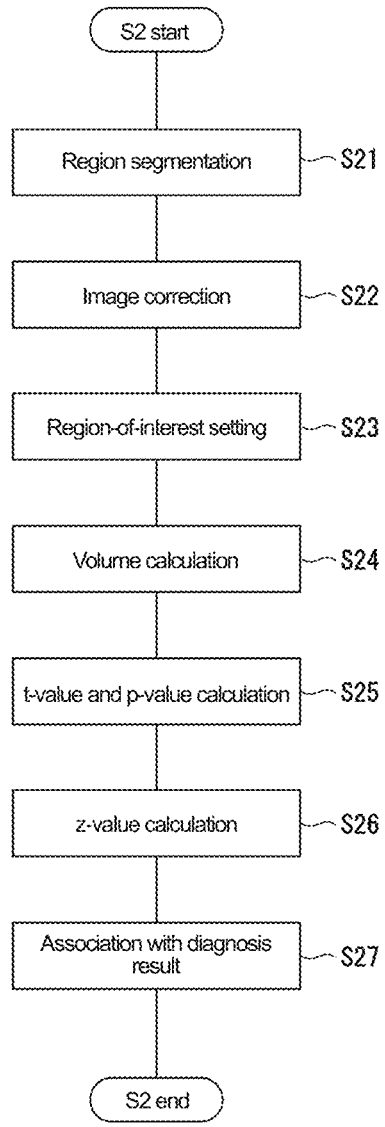
FIG. 4 is a flowchart showing the procedure of a teacher data generation step in the machine learning method according to the first embodiment of the present invention.

The machine learning method according to the present embodiment is performed by using the machine learning device 1 shown in FIG. 2. FIG. 3 is a flowchart showing the entire procedure of the machine learning method according to the present embodiment. FIG. 4 is a flowchart showing the procedure of a teacher data generation step in the machine learning method according to the present embodiment.

In step S1 shown in FIG. 3, the brain image acquisition unit 121 and the diagnosis result acquisition unit 128 respectively acquire brain images D1 and diagnosis results D2 of multiple persons from the diagnosis information database DB. The brain image D1 and diagnosis result D2 of one person may be acquired, or the brain images D1 and diagnosis results D2 of multiple persons may be acquired at one time.

In step S2, the teacher data generation unit 12 generates teacher data D3 from the acquired brain images D1 and diagnosis results D2.

FIG. 4 is a flowchart showing the specific processing procedure of step S2 for producing teacher data. Step S2 mainly comprises steps S21 to S27.

In step S21, the region segmentation unit 122 separates and removes tissues other than the brain from the acquired brain image D1, further segments the brain image, from which tissues other than the brain have been separated and removed, into gray matter, white matter, and a spinal fluid part, and separates the lateral ventricle from the spinal fluid part. In the present embodiment, in order to prevent brain lesions from being ignored by standardization using a conventional method such as SPM, the region segmentation unit 122 segments the brain image using a signal intensity-dependent maximum-likelihood method and a posterior probability method. For the purpose of preventing the incorporation of white matter lesions into the gray matter occurring as a result of the above, a multichannel segmentation technique that introduces FLAIR images into segmentation is now available.

Figure 5:
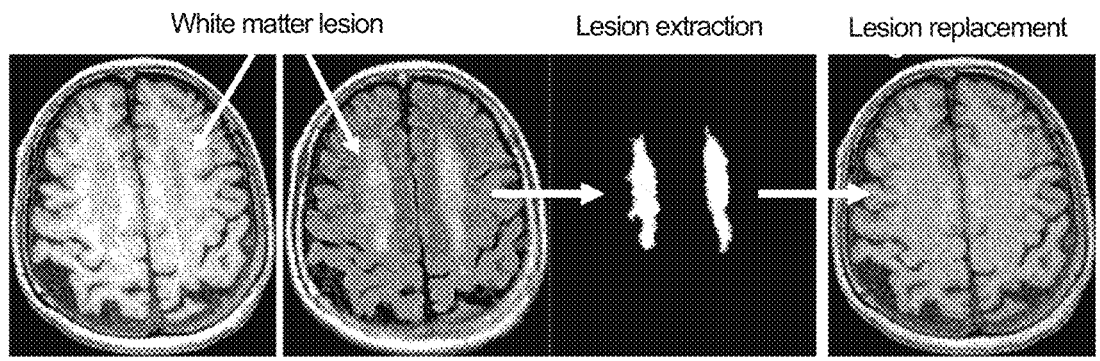
FIG. 5 is a specific example of a brain image segmentation method.
Figure 6:
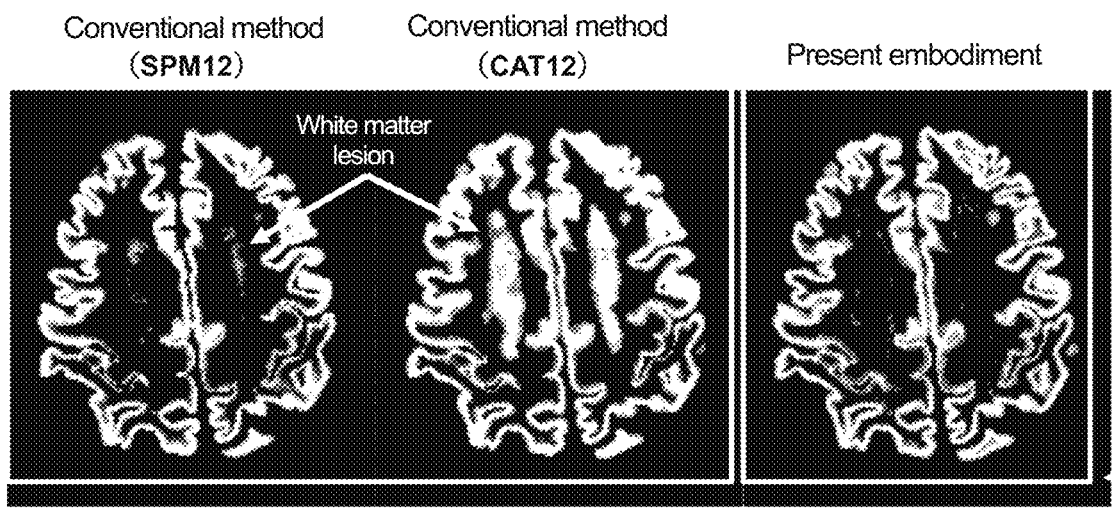
FIG. 6 is an explanatory diagram of the effect of brain image segmentation.

Specifically, as shown in FIG. 5, a FLAIR image with low space information is complemented to an image with higher space information by three-dimensional brain image data, and only white matter lesions are then extracted, followed by filling (replacement) with the average signal value of the white matter of the subject. This allows separation with unprecedented accuracy in the present embodiment, as shown in FIG. 6.

Figure 7:
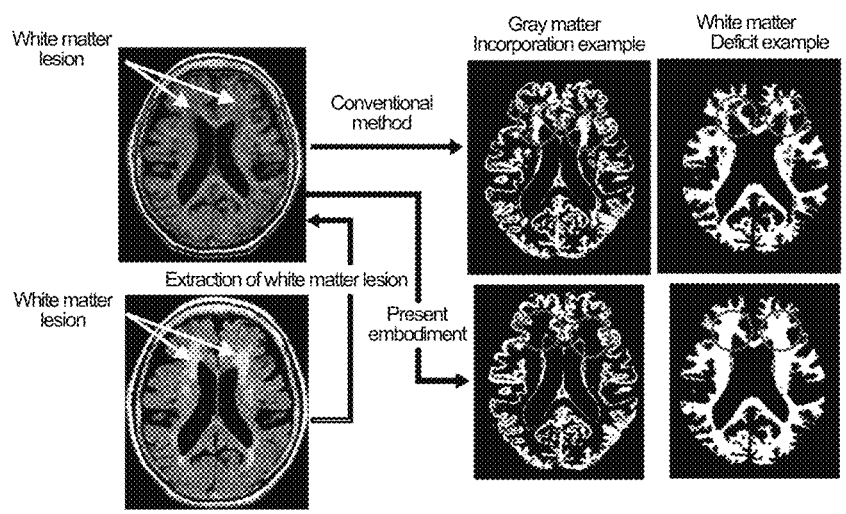
FIG. 7 is an explanatory diagram of the effect of brain image segmentation.
Figure 8:
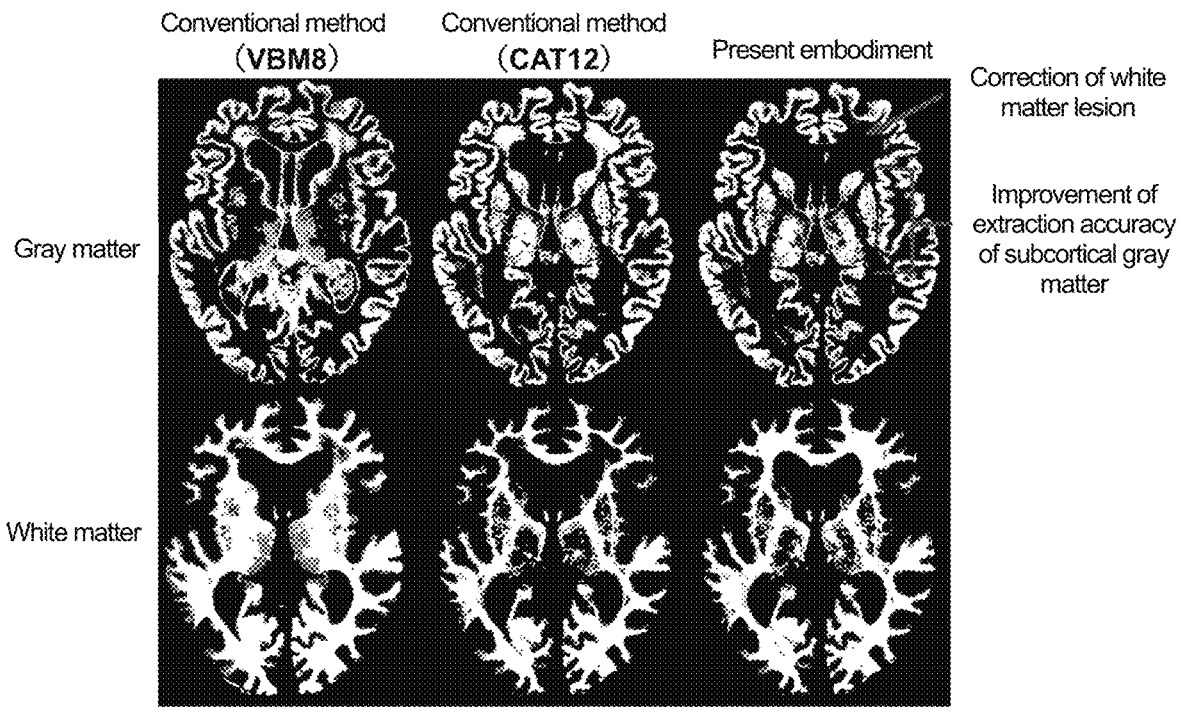
FIG. 8 is an explanatory diagram of the effect of brain image segmentation.
Figure 9:
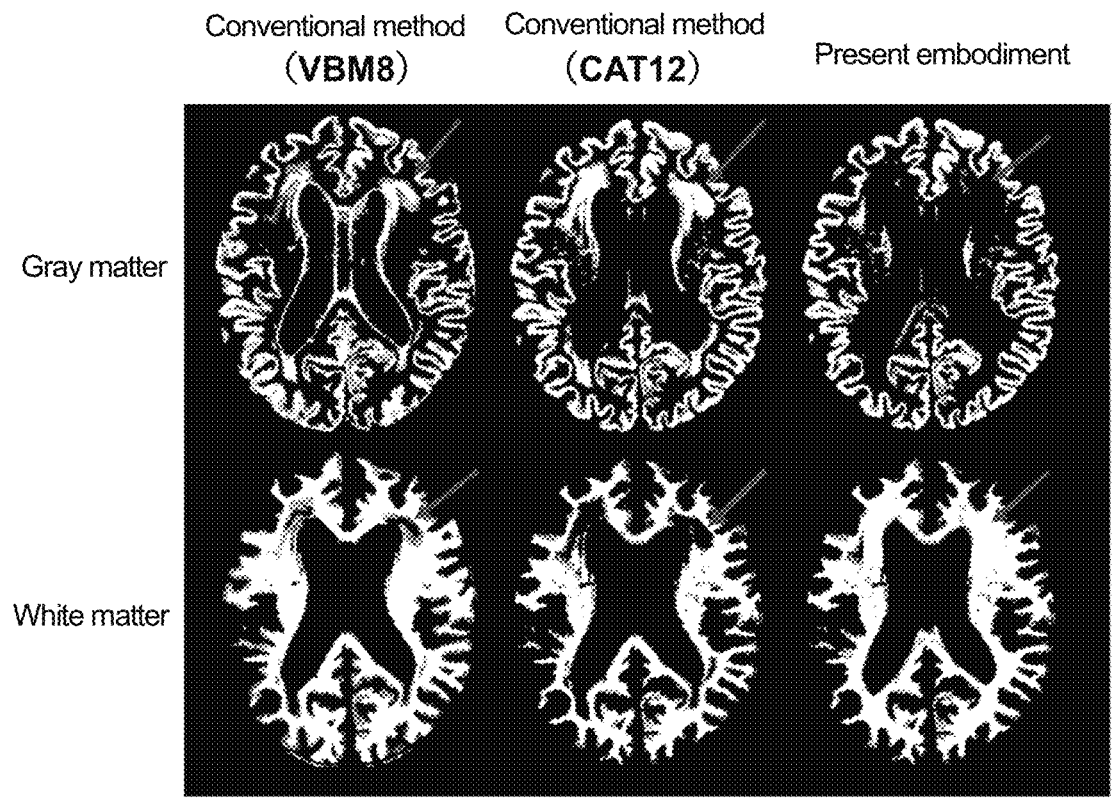
FIG. 9 is an explanatory diagram of the effect of brain image segmentation.

FIGS. 7 to 9 are other examples showing the effects of the method of the present embodiment. In FIGS. 7 to 9, according to conventional methods, white areas are incorporated into the upper two locations of the gray matter, and the white matter is missing in the upper two locations of the white matter. Use of the method of the present embodiment allows separation with unprecedented accuracy.

Thereafter, if necessary, the image quality of the brain image may be evaluated, and if the image quality is below a certain level, displaying a warning or like processing may be performed.

In step S22, the image correction unit 123 nonlinearly transforms the brain segmented in step S21 into coordinates in MNI space. In the transformation, the image correction unit 123 converts the tensor quantity for each voxel into a signal value.

In step S23, the region-of-interest setting unit 124 sets multiple regions of interest in the brain regions included in the brain image, i.e., gray matter, white matter, and lateral ventricle. In the present embodiment, the region-of-interest setting unit 124 segments the gray matter into 290 parts, the white matter into 33 parts, and the lateral ventricle separated from other brain ventricles into 2 parts (left and right lateral ventricles), and sets each of the segmented regions as a region of interest.

As described above, the region segmentation unit 122 separates the lateral ventricle from the spinal fluid part. In general brain atrophy, the brain surface shrinks toward the center (a gap is formed between the skull and the brain surface); however, when there are white matter lesions, the lateral ventricle expands compensatory and the brain surface shrinks from inside to outside. Because of this, in the present embodiment, the region segmentation unit 122 separates the lateral ventricle. As a result of this procedure, the boundary between the lateral ventricle, gray matter, and white matter can be accurately determined, thereby increasing discrimination accuracy.

Figure 10:
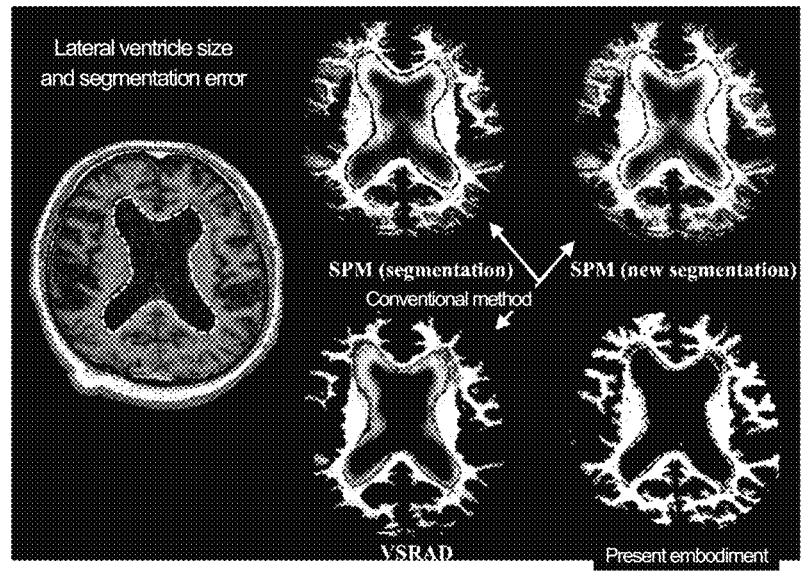
FIG. 10 is an explanatory diagram of the effect of lateral ventricle separation.

FIG. 10 shows the effect of separation of the lateral ventricle in the present embodiment. When 3 cases determined by conventional methods are compared with the present embodiment in the lower right portion, the boundary between the lateral ventricle and the white matter is accurately obtained, as shown separated by a dashed line in the figure. This allows discrimination with higher accuracy than before.

The gray matter can be segmented by using 108 automated anatomical labeling (AAL) regions, 8 regions such as the entorhinal area related to Alzheimer's disease prepared by the present inventor, 118 Brodmann regions, and 56 Loni Probabilistic Brain Atlas 40 (LPBA40) regions. The white matter can be segmented by regions of interest uniquely created in MNI space.

In conventional methods, the size of the corpus callosum can be evaluated only by its cross-sectional area in a sagittal section. In the present embodiment, for the three-dimensional evaluation of this, the boundary between the corpus callosum and the surrounding white matter is determined by the surface tension and viscosity parameters of a fluid to thereby separate the surrounding white matter.

Since the corpus callosum is continuous with the subcortical white matter without boundaries, a special technique is required to create its regions of interest. More specifically, in a three-dimensional brain image, a virtual fluid is placed in the frontal and occipital parts of the corpus callosum, and a situation in which the virtual fluid expands three-dimensionally in the brain is simulated to determine its boundary. Typically, assuming water droplets equivalent to the spinal fluid, the frontal and occipital side shapes of the corpus callosum are determined from the shape of the water droplets as they spread freely, based on their surface tension and viscosity, thereby determining the shapes of the gray matter and white matter in contact with the corpus callosum. This can clarify the boundary surface that actually has a fine and intricate three-dimensional shape by a simple but highly accurate method.

Figure 11:
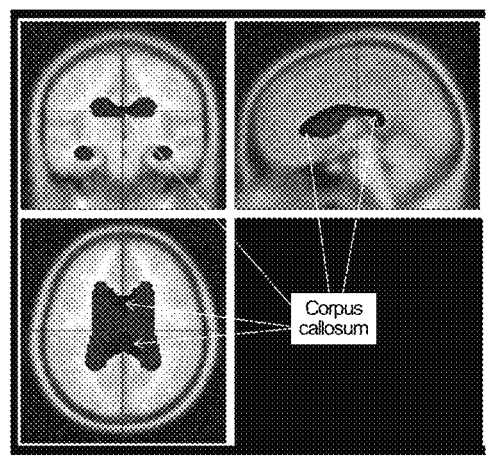
FIG. 11 is an explanatory diagram of an example in which a three-dimensional structure of the corpus callosum was determined and its boundary was clarified.

FIG. 11 shows an example in which the three-dimensional structure of the corpus callosum is determined and its boundary is clarified by the method of the present embodiment. This clarifies the boundary between the gray matter and white matter, increasing discrimination accuracy. Further, the lateral ventricle volume can be measured with high accuracy by excluding the corpus callosum that falls within the region of interest for the lateral ventricle.

In conventional methods such as SPM, this processing is performed by obtaining a posterior probability by Bayesian estimation, and intermediate values between 0 and 1 are defined as partial volume. However, this would ignore outlier values due to lesions, which does not satisfy the object of the present invention. In the present embodiment, Bayesian estimation is used only in the initial stages such as affine transformation and skull strip, and the segmentation processing is performed using a maximum likelihood estimation method based on signal values of the image. White matter lesions are problematic in this case; however, in the present embodiment, as shown in FIG. 5, the problem is solved by using a three-dimensional brain image, complementing the space information of a FLAIR image, extracting white matter lesions from the FLAIR image with excellent contrast, and pasting them into the three-dimensional image.

The lateral ventricle can be segmented by using a template prepared beforehand in MNI space by the inventor.

In step S24, the volume calculation unit 125 calculates the volume of each region of interest. In the present embodiment, the volume calculation unit 125 calculates the volume using the Jacobian matrix in the tensor transformation. The reason for calculating volume instead of concentration is that volume values can be used universally. For example, even if z-values after statistical processing are the same, volume values may be different. In conventional methods, after calculating the volume for each voxel, the volume is calculated as the sum of voxels within the region of interest, whereas in the present embodiment, the calculation is performed using the region of interest as one unit. Theoretically, the results are the same for both methods; however, in practice, calculating the volume for each region of interest is more accurate because volume values for each voxel are more susceptible to noise.

In step S25, the t-value and p-value calculation unit 126 calculates a t-value by replacing the t-distribution with the normal distribution. For this purpose, the commonly used IXI database is used as a control group. The IXI database has around 100 cases of normal brain for each age group, and there is no problem in replacing them as the normal distribution.

Specifically, if the values (volume for each region of interest) to be examined in the population are normally distributed (if the number of subjects in the survey is large, values are estimated to be normally distributed), in order to examine whether there is a statistically significant difference in average values between two groups (healthy subjects and Alzheimer's disease patients), the t-value is determined by the following mathematical formula.

$$t = \frac{\bar{x} - \mu_0}{s/\sqrt{n}}$$

$\bar{x}$: sample mean
s: sample standard deviation
n: sample size
The degree of freedom is n−1.

The p-value indicates what t-value can be used to set the boundary to be statistically significant from the t-value obtained by the above mathematical formula. The z-value is determined by replacing the p-value on the T-distribution by the p-value on the Z-distribution.

In step S26, the z-value calculation unit 127 calculates the z-value in each region of interest based on the t and p-values in each region of interest. As a result, the z-values in the multiple regions of interest are calculated from the brain image D1.

The z-value is for statistical validation determined from the t- and p-values. Specifically, in healthy subjects, the distribution of the volumes of regions of interest at a site is determined and applied to normal distribution. The z-value indicates standard deviation showing to which position of the normal distribution the volume of the region of interest at the same site of patients corresponds. In the case of a normal distribution (mean=0, standard deviation=1), the standard deviation value is obtained as the z-value. In the present embodiment, the t-test is performed, and the obtained value is thus a t-value. If the population has a normal distribution, this value is almost the same as the z-value. The z-value in this case is a z-value when the z-test is performed, and refers to a z-value indicating standard deviation.

Since the z-values are standardized values, they are suitable as input values for the subsequent artificial intelligence. This is because the weighting is not biased in the early stage when artificial intelligence learning extracts target features from the input values.

In step S27, the data including the multiple regions of interest and z-values are associated with the diagnosis results D2 to generate teacher data D3.

S2 shown in FIG. 3 is terminated by steps S21 to S27 described above. The generated teacher data D3 is stored in the auxiliary storage device 11, and steps S1 and S2 are repeated until the teacher data D3 is sufficiently stored in the auxiliary storage device 11 (YES in step S3).

Subsequently, in step S4, the first learning unit 131 learns a prediction algorithm D4 (SVMst) based on the teacher data D3 stored in the auxiliary storage device 11. In the present embodiment, the learning unit 13 performs learning by a support vector machine (SVM) using a radial basis function (RBF) kernel. At this time, the optimal value of the hyperparameter is determined using the leave-one-out method for cross-validation, and versatile discriminant boundaries between a target group of Alzheimer's disease patients, a target group of patients reaching Alzheimer's disease, and a target group of patients not reaching Alzheimer's disease are determined. The learned prediction algorithm D4 is stored in the auxiliary storage device 11.

Subsequently, in step S5, the second learning unit 132 further performs additional learning by imputing scores of the Mini-Mental State Examination (MMSE; a set of questions developed for dementia diagnosis by Folstein et al. in 1975 in the U.S.) into the prediction algorithm D4 from the diagnosis information database DB to generate a prediction algorithm D5 (SVMcog). The prediction algorithm D5 is stored in the auxiliary storage device 11.

Learning by the first learning unit 131 and learning by the second learning unit 132 may be performed in parallel. Specifically, the first learning unit 131 may learn the diagnosis results D2 as correct answer labels, and the z-value of each region of interest as a diagnostic input variable, and the second learning unit 132 may learn the diagnosis results D2 as correct answer labels, and the z-value of each region of interest and the MMSE score as input variables.

Diagnosis Assistance Device

The form of disease determination using the learned prediction algorithm D4 is described below.

Figure 12:
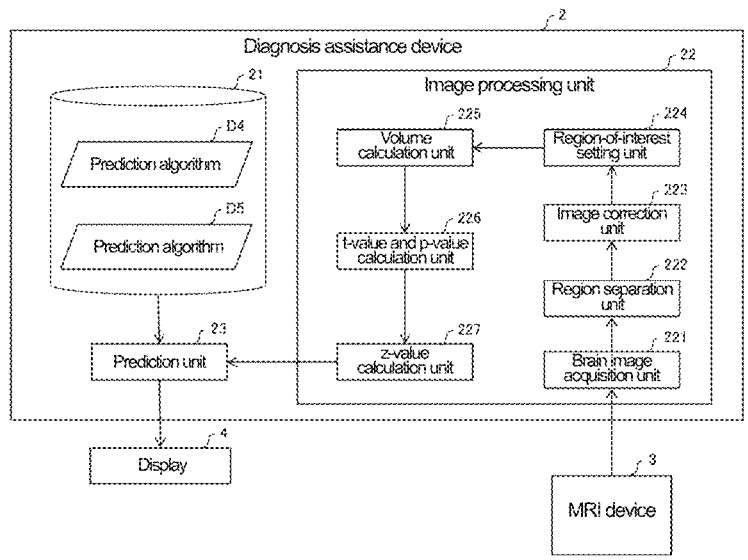
FIG. 12 is a block diagram showing the function of a diagnosis assistance device according to the first embodiment of the present invention.

FIG. 12 is a block diagram showing the function of a diagnosis assistance device 2 according to the present embodiment. As with the machine learning device 1 shown in FIG. 2, the diagnosis assistance device 2 can be configured, for example, from a general-purpose personal computer. That is, the diagnosis assistance device 2 comprises CPU (not shown), a main storage device (not shown), an auxiliary storage device 21, and the like as hardware configurations. In the diagnosis assistance device 2, the CPU reads out various programs stored in the auxiliary storage device 21 to the main storage device and executes them, thereby executing various kinds of arithmetic processing. The auxiliary storage device 21 can be configured, for example, from a hard disk drive (HDD) or a solid-state drive (SSD), and stores the learned prediction algorithms D4 and D5. Further, the auxiliary storage device 21 may be built into the diagnosis assistance device 2, or may be provided as an external storage device separate from the diagnosis assistance device 2.

The diagnosis assistance device 2 is connected to an MRI device 3, and a brain image of the subject acquired by the MRI device 3 is sent to the diagnosis assistance device 2. The brain image of the subject acquired by the MRI device 3 may be once stored in a recording medium, and the brain image may be input into the diagnosis assistance device 2 via the recording medium.

The diagnosis assistance device 2 has the function of predicting the possibility that the subject will develop Alzheimer's disease within a prescribed period (e.g., within 5 years) (i.e., the possibility that the subject is ADNC spectrum), based on the brain image of the subject. In order to achieve this function, the diagnosis assistance device 2 comprises an image processing unit 22 and a prediction unit 23 as function blocks.

Figure 13:
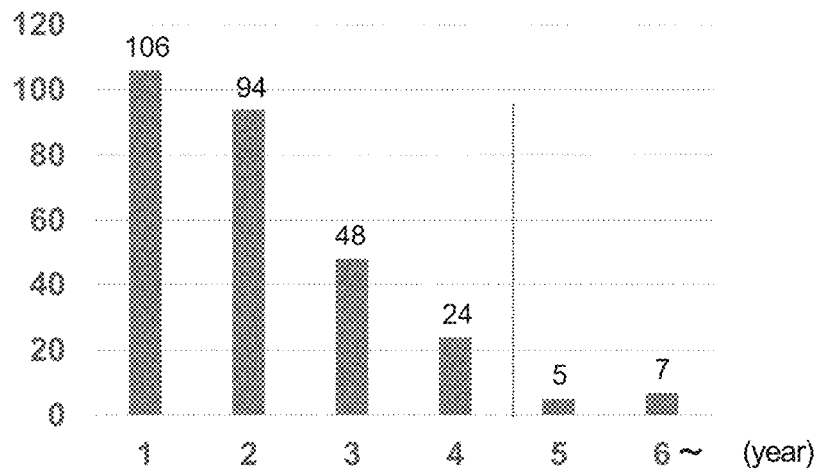
FIG. 13 is a graph showing the period until pMCI patients develop AD.

In the ADNI database, regarding 284 patients who developed Alzheimer's disease after diagnosis as mild cognitive impairment (pMCI), FIG. 13 shows the period from diagnosis to onset. The data reveal that 87.3% of the pMCI patients developed the disease within 3 years, 95.8% within 4 years, and 97.5% within 5 years. Therefore, the prescribed period is not particularly limited, but is preferably 3 to 5 years.

The image processing unit 22 sets multiple regions of interest in the brain region for the brain image acquired from the outside, performs arithmetic processing, such as calculation of the z-value of each region of interest, and outputs the z-value of each region of interest to the prediction unit 23. In order to generate the z-value of each region of interest, the image processing unit 22 comprises a brain image acquisition unit 221, a region segmentation unit 222, an image correction unit 223, a region-of-interest setting unit 224, a volume calculation unit 225, a t-value and p-value calculation unit 226, and a z-value calculation unit 227. These function blocks have the same functions as the brain image acquisition unit 121, region segmentation unit 122, image correction unit 123, region-of-interest setting unit 124, volume calculation unit 125, t-value and p-value calculation unit 126, and z-value calculation unit 127 of the teacher data generation unit 12 shown in FIG. 2.

The brain image of the subject is acquired by the brain image acquisition unit 221. Thereafter, each of the region segmentation unit 222 to the z-value calculation unit 227 performs the processing of steps S21 to S27 shown in FIG. 4, and generates the z-value of each region of interest.

The prediction unit 23 predicts the possibility that the subject is ADNC spectrum, according to the prediction algorithm D4. In the present embodiment, the prediction unit 23 predicts the possibility that the subject is ADNC spectrum, based on the z-value of each region of interest generated by the image processing unit 22. The prediction result is displayed, for example, on a display 4 connected to the diagnosis assistance device 2. The possibility that the subject is ADNC spectrum can be determined by a sigmoid function as a posterior probability (0 to 1) from the distance to a hyperplane (hyperplane in elementary geometry, a generalization of the two-dimensional plane to other dimensions). Further, the diagnosis assistance device 2 may simply predict whether the subject is ADNC spectrum.

From the above, the diagnosis assistance device 2 predicts the possibility that the subject is ADNC spectrum, using the prediction algorithm D4. The prediction algorithm D4 is obtained by machine learning in the machine learning device 1, and machine learning using a sufficient amount of teacher data D3 makes it possible to increase the prediction accuracy of the diagnosis assistance device 2. Thus, in the present embodiment, the possibility that the subject is ADNC spectrum can be predicted with high accuracy by using artificial intelligence.

Additional Notes

The present invention is not limited to the above embodiment, and can be changed in various ways within the scope shown in the claims. Forms obtained by suitably combining the technical means disclosed in the embodiment are also included in the technical scope of the present invention.

For example, MRI images are used as brain images in the above embodiment; however, X-ray CT images, SPECT images, PET images, or the like may also be used. Further, changes over time in MRI images using tensor-based morphometry may also be used.

In the above embodiment, the machine learning device 1 comprises both the teacher data generation unit 12 and the learning unit 13; however, the teacher data generation unit 12 and the learning unit 13 may be achieved as separate devices. That is, teacher data D3 generated in a device other than the machine learning device 1 may be input into the machine learning device 1, and the machine learning device 1 may only learn the prediction algorithms D4 and/or D5.

Similarly, the image processing unit 22 and prediction unit 23 of the diagnosis assistance device 2 may be achieved as separate devices. In this case, the z-value of each region of interest generated in a device other than the diagnosis assistance device 2 may be input into the diagnosis assistance device 2, and the diagnosis assistance device 2 may only perform prediction based on the prediction algorithms D4 and/or D5.

In the above embodiment, the teacher data D3 for learning the prediction algorithms D4 and D5 are generated from brain images of multiple ADNC patients, and diagnosis results indicating whether each patient is ADNC spectrum; however, the present invention is not limited thereto. For example, teacher data may be generated from brain images of AD patients, MCI patients, and healthy subjects without Alzheimer's disease. Even when a diagnosis assistance device is constructed using a prediction algorithm learned based on such teacher data, the possibility that subjects will develop Alzheimer's disease can be predicted with higher accuracy than by using conventional techniques, as shown in the Examples provided later.

The technique disclosed in PTL 2 predicts whether patients with mild cognitive impairment (MCI) will develop Alzheimer's disease within a prescribed period, which is different from the present invention. However, since there are no clear criteria for determining whether patients have MCI, it is difficult to accurately select prediction targets. In contrast, in the present invention, the prediction targets are ADNC spectrum, without clearly distinguishing between healthy subjects and MCI or between MCI and Alzheimer's disease. That is, the prediction targets may be subjects who have already developed AD or subjects who will develop AD in the future, as long as they are ADNC spectrum. Therefore, it is possible to accurately assign teacher labels during learning and to prevent the accuracy of prediction results from deteriorating. In addition, by using the present invention to predict that subjects who have not developed Alzheimer's disease will progress to Alzheimer's disease in the future, ADNC patients who should be targeted for disease-modifying therapies (DMTs) using expensive aducanumab etc. in the future can be appropriately selected.

In the above embodiment, the region segmentation units 122 and 222 segment a brain image into gray matter, white matter, and a spinal fluid part, and separate the lateral ventricle from the spinal fluid part. Alternatively, only the gray matter may be separated from the image. In this case, the region-of-interest setting units 124 and 224 set multiple regions of interest in the gray matter, the t-value and p-value calculation units 126 and 226 calculate the t- and p-values in each region of interest for the volume of each region of interest set in the gray matter, and the z-value calculation units 127 and 227 calculate the z-value of each region of interest based on the t- and p-values.

Second Embodiment

A second embodiment of the present invention is described below with reference to the attached drawings. The present invention is not limited to the following embodiment. The members having the same functions as those of the first embodiment described above are denoted by the same reference numerals, and their explanations are omitted.

Entire Structure

Figure 14:
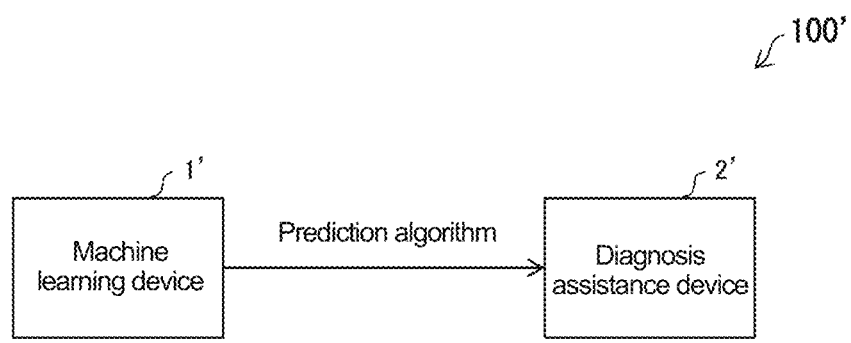
FIG. 14 is a block diagram showing a schematic structure of a prediction system according to a second embodiment of the present invention.

FIG. 14 is a block diagram showing a schematic structure of a prediction system 100' according to the present embodiment. The prediction system 100' comprises a machine learning device 1' and a diagnosis assistance device 2'. The machine learning device 1' learns a prediction algorithm for predicting the possibility that an ADNC subject will develop Alzheimer's disease within a prescribed period. The diagnosis assistance device 2' predicts the possibility that an ADNC subject will develop Alzheimer's disease within a prescribed period, according to the prediction algorithm learned by the machine learning device 1'. The machine learning device 1' and the diagnosis assistance device 2' may be achieved as separate devices, or the machine learning device 1' and the diagnosis assistance device 2' may be configured as a single device.

Configuration examples of the machine learning device 1' and diagnosis assistance device 2' are described below.

Machine Learning Device

Figure 15:
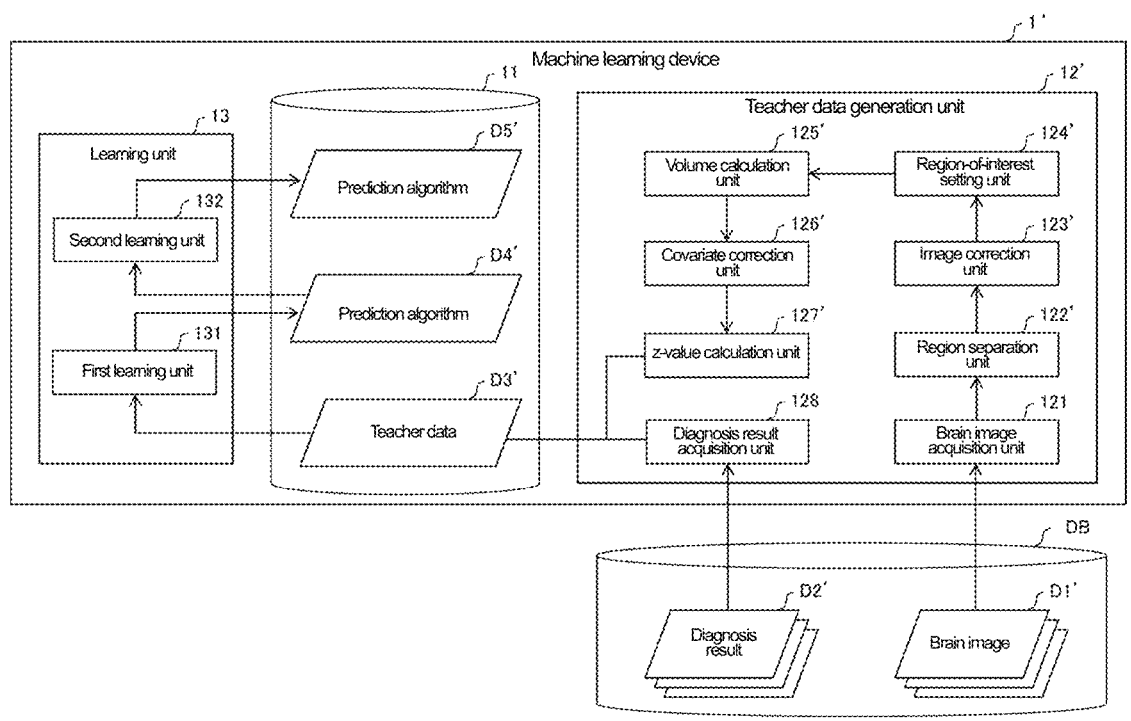
FIG. 15 is a block diagram showing the function of a machine learning device according to the second embodiment of the present invention.

FIG. 15 is a block diagram showing the function of the machine learning device 1' according to the present embodiment. The hardware configurations of the machine learning device 1' may be the same as those of the machine learning device 1 shown in FIG. 1.

The machine learning device 1' has the function of learning prediction algorithms D4' and D5' for predicting the possibility that an ADNC subject will develop Alzheimer's disease within a prescribed period (e.g., within 5 years).

In order to achieve this function, the machine learning device 1' comprises a teacher data generation unit 12' and a learning unit 13 as function blocks. The teacher data generation unit 12' is a function block that generates teacher data D3' from brain images D1' and diagnosis results D2' of multiple persons. The multiple persons are patients diagnosed as having ADNC and healthy subjects.

The learning unit 13 is a function block that learns the prediction algorithms D4' and D5' based on the teacher data D3'. The teacher data generation unit 12' and the learning unit 13 are achieved by executing machine learning programs stored in the auxiliary storage device 11.

The machine learning device 1' is accessible to a diagnosis information database DB. The diagnosis information database DB stores brain images D1' of multiple persons, and diagnosis results D2' indicating whether each person is ADNC spectrum and whether each person is a healthy subject. In the present embodiment, the brain images D1' are three-dimensional MRI images.

As function blocks for generating the teacher data D3', the teacher data generation unit 12' comprises a brain image acquisition unit 121, a region separation unit 122', an image correction unit 123', a region-of-interest setting unit 124', a volume calculation unit 125', a covariate correction unit 126', a z-value calculation unit 127', and a diagnosis result acquisition unit 128.

The brain image acquisition unit 121 acquires a brain image D1 from the diagnosis information database DB. The region separation unit 122' to the z-value calculation unit 127' set multiple regions of interest (ROI) in the brain region for the acquired brain image D1, and perform arithmetic processing, such as calculation of z-values of the regions of interest. The specific details of the arithmetic processing of each of the region separation unit 122' to the z-value calculation unit 127' are described later.

The diagnosis result acquisition unit 128 acquires the diagnosis result D2' of each person, whose brain image D1' has been acquired, from the diagnosis information database DB. The teacher data generation unit 12' associates the z-value of each region of interest with the diagnosis result D2 for each person to generate teacher data D3', and stores the data in the auxiliary storage device 11.

The learning unit 13 comprises a first learning unit 131 and a second learning unit 132. The first learning unit 131 learns a prediction algorithm D4' based on the teacher data D3', and stores the learned prediction algorithm D4' in the auxiliary storage device 11. The second learning unit 132 further learns the prediction algorithm D4', and stores a learned prediction algorithm D5' in the auxiliary storage device 11. Although the machine learning method is not particularly limited, in the present embodiment, the first learning unit 131 and the second learning unit 132 are configured from support vector machines, as with the first embodiment.

Machine Learning Method

Figure 16:
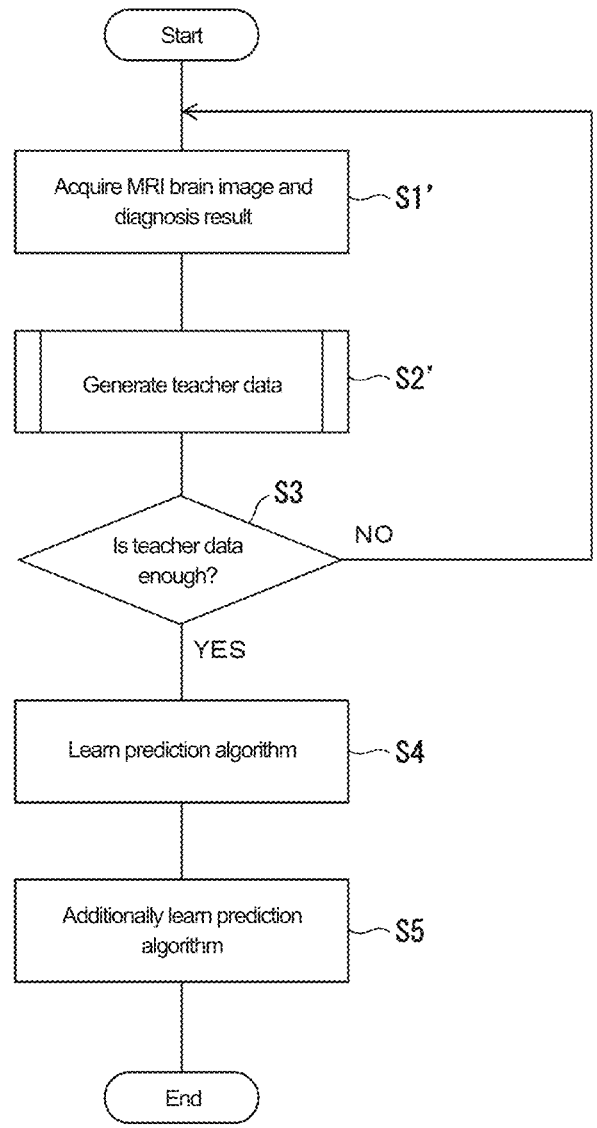
FIG. 16 is a flowchart showing the entire procedure of a machine learning method according to the second embodiment of the present invention.
Figure 17:
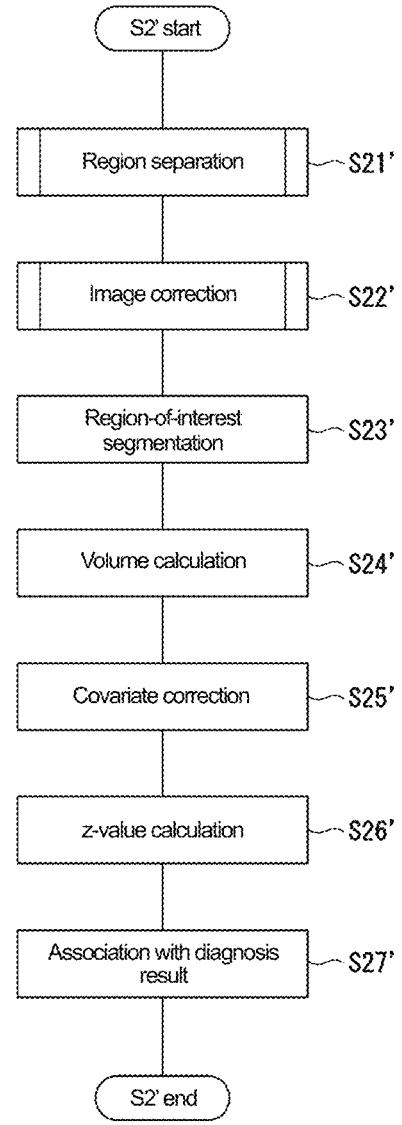
FIG. 17 is a flowchart showing the procedure of a teacher data generation step in the machine learning method according to the second embodiment of the present invention.

The machine learning method according to the present embodiment is performed by using the machine learning device 1' shown in FIG. 15. FIG. 16 is a flowchart showing the entire procedure of the machine learning method according to the present embodiment. FIG. 17 is a flowchart showing the procedure of a teacher data generation step in the machine learning method according to the present embodiment.

In step S1' shown in FIG. 16, the brain image acquisition unit 121 and the diagnosis result acquisition unit 128 acquire, respectively, brain images D1' and diagnosis results D2' of multiple persons from the diagnosis information database DB. The brain image D1' and diagnosis result D2' of one person may be acquired, or the brain images D1' and diagnosis results D2' of multiple persons may be acquired at one time.

In step S2', the teacher data generation unit 12' generates teacher data D3' from the acquired brain images D1' and diagnosis results D2'.

FIG. 17 is a flowchart showing the specific processing procedure of step S2' for generating teacher data. Step S2' mainly comprises steps S21' to S26'.

Figure 18:
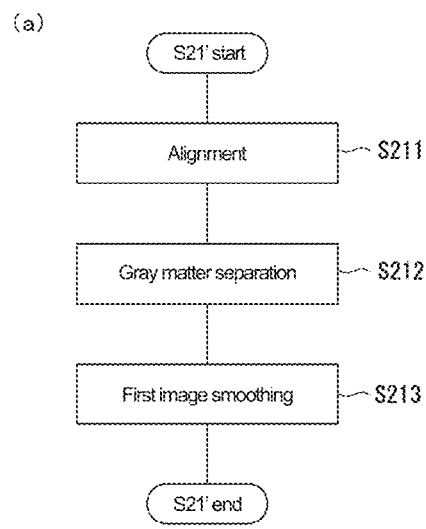
FIG. 18 (a) is a flowchart showing the procedure of a region separation step, and (b) is a flowchart showing the procedure of an image correction step.
Figure 18:
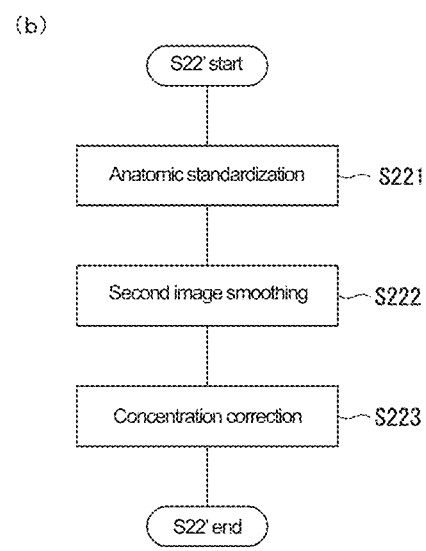

In step S21', the region separation unit 122' separates gray matter tissue from the brain image D1'. Specifically, the region separation unit 122' performs the processing of steps S211 to S213 shown in FIG. 18(*a*).

In step S211, the brain image is subjected to alignment processing with the brain image segmented into voxel units. Specifically, in order to match the brain image to the shape of a standard brain image so as to separate gray matter with good accuracy in step S212 described later, four types of transformation (translation, rotation, scaling, and shear) are performed by linear transformation (affine transformation) to correct the spatial location and angle of the brain image. Specifically, four types of transformation parameters (translation, rotation, scaling, and shear) are obtained for each of the x, y, and z directions in three-dimensional space (12 parameters in total), such that the sum of squares of errors between the brain image and the standard brain image template is minimized. Then, using the obtained parameters, the brain image is subjected to affine transformation to achieve spatial alignment of the brain image with respect to the standard brain image whose location, size, etc. are predefined. In this alignment processing, it is also effective to add, in addition to linear transformation, nonlinear transformation to further approximate the shape to the standard brain image. Since the cubic voxels segmented beforehand are deformed by the deformation of the brain into the standard brain image by this alignment processing, voxel segmentation is performed again on the brain image after the alignment processing.

In step S212, gray matter extraction processing is performed using the newly segmented voxels. The input T1-weighted brain image includes three types of tissue: gray-colored gray matter corresponding to nerve cells, white matter brighter in color than the gray matter and corresponding to nerve fibers, and substantially black-colored cerebrospinal fluid. Therefore, in the gray matter extraction processing, attention is focused on gray matter tissue, and the processing of extracting the gray matter tissue by voxel unit is performed. Specifically, the gray matter is separated from the brain image including the gray matter, white matter, and cerebrospinal fluid by clustering into these three clusters. For this clustering processing, a model of concentration values and a model of existence probability of the three tissues with respect to spatial locations can be used.

The model of concentration values is obtained by modeling of different distributions of voxel concentration values for each tissue. The tissues are arranged in the order of white matter, gray matter, and cerebrospinal fluid, in descending order of their concentration values (i.e., closer to white). It is assumed that the histogram of concentration values after separating each of them will be normal distribution.

The model of existence probability of the three tissues with respect to spatial locations expresses, as probability, the difference in the spatial distribution of tissues in brain images due to individual differences. It is assumed that each voxel belongs to any of the tissues, and that the existence probability of each tissue is known in advance according to its spatial location.

Optimal tissue distribution in which the above two assumptions both hold is estimated. The existence probability calculated beforehand for each voxel for the respective tissues of gray matter, white matter, and cerebrospinal fluid from the brain images of many healthy subjects is used as a template, whereby a brain image in which gray matter tissue is extracted three-dimensionally can be obtained. If the gray matter tissue is separated by voxel units based on the existence probability, fine irregularities occur on the boundary surface etc., resulting in an unnatural shape.

Accordingly, in step S213, image smoothing (first image smoothing) is performed on the gray matter brain image from which the gray matter tissue is extracted. In this step, for the purpose of improving the S/N ratio of the image and making the smoothness of the image equal to that of a template image used for the next second standardization, the image is smoothed by a three-dimensional Gaussian kernel. The half-value width (FWHM) of the filter used for smoothing is, for example, about 8 mm. As specific processing, the three-dimensional convolution of a three-dimensional brain image and a three-dimensional Gaussian function is performed. This can be done by sequentially performing one-dimensional convolution in the x, y, and z directions.

As a result of the processing of S211 to S213 described above, the region separation unit 122' separates the gray matter tissue from the brain image D1'.

Next, in step S22', the image correction unit 123' deforms the gray matter brain image separated and smoothed in step 21' to match a standardized template (hereinafter referred to as the "template"), so that it can be accurately segmented into regions of interest in the subsequent processing steps. Specifically, the image correction unit 123' performs the processing of steps S221 to S223 shown in FIG. 18(b).

In step S221, deformation called "anatomic standardization" is applied to the smoothed gray matter brain image, and global correction for the size of the entire brain and local correction for the size of part of the brain are performed in order to absorb differences in the anatomical shape and size of the gray matter brain image due to individual differences.

Specifically, using linear and nonlinear transformations, the smoothed gray matter brain image is subjected to image processing to minimize the sum of squares of errors from the template. The gray matter brain image template used here is the average image obtained from brain images from which gray matter tissue is extracted from many healthy subjects. In this anatomic standardization processing, linear transformation is first used for global correction of position, size, and angle, and then nonlinear transformation is used for correction of local shapes such as irregularities. The linear transformation performed here is affine transformation as in step S211. The nonlinear transformation transforms the original image by nonlinear transformation using DARTEL in each of the x and y directions.

In step S222, the gray matter brain image deformed by anatomic standardization (hereinafter also referred to as the standardized brain image) is subjected to voxel-segmentation again and then subjected to image smoothing (second image smoothing). This processing is to improve the S/N ratio of the above standardized brain image and to make the smoothness of the image equal to that of the images of healthy subjects, which will be used as a standard for later comparison. The half-value width (FWHM) of the filter is about 12 to 15 mm, for example. Specifically, this processing can be achieved in the same manner as in the first image smoothing process in step S213, except for the difference in the FWHM value. By performing image smoothing again in this way, individual differences that do not perfectly match in the anatomic standardization processing can be reduced.

In step S223, concentration correction is performed on the standardized brain image after the second image smoothing. The voxel concentration value, which corresponds to the pixel value in units of voxels, is corrected. A constant value is added to or subtracted from the voxel value of the standardized brain image so that the average voxel value of the standardized brain image matches the average voxel value of the gray matter brain imaging template.

As a result of the processing of S221 to S223 described above, the image correction unit 123' corrects the gray matter brain image to match the template.

In step S23', the region-of-interest setting unit 124' sets N-number of regions of interest (ROI) in the gray matter separated by the region separation unit 123'. In the present embodiment, 290 regions of interest (N=290) obtained by segmentation based on four atlases are set. The four atlases are 108 automated anatomical labeling (AAL) regions, 8 regions such as the entorhinal area related to Alzheimer's disease prepared by the present inventor, 118 Brodmann regions, and 56 Loni Probabilistic Brain Atlas 40 (LPBA40) regions. A total of 290 of these regions are designated as the regions of interest.

In step S24', the volume calculation unit 125' calculates the volume X of each region of interest. In the present embodiment, the gray matter separated from the brain image is partially or fully compressed or extended by anatomic standardization processing. At this time, the color of the compressed part of the image becomes white, and the color of the extended part becomes black. The volume calculation unit 125' corrects the volume of each region of interest in the anatomically standardized gray matter based on the concentration of the image to calculate the original volume in a space corresponding to each region of interest before standardization.

However, it has been confirmed that the volume of each region of interest calculated by the volume calculation unit 125' is biased due to the age and intracranial volume. Accordingly, in step S25', correction calculation is performed in the covariate correction unit 126' to avoid the influence of those biases. The value obtained by this covariate correction is used as the X-value to be able to evaluate the atrophy state of gray matter tissue in each region of interest under the same conditions.

Not surprisingly, the gray matter tissues in the teacher data have a bias that is not present in the gray matter tissues of healthy subjects. This bias is a feature of Alzheimer's disease. Accordingly, in the present embodiment, the X-values of the regions of interest of the gray matter tissues of healthy subjects are used as standard reference data, and the X-values of the regions of interest of the gray matter tissues in the teacher data are used as comparison data, so that features of the teacher data can be obtained. The distribution of the region-of-interest X-values of the gray matter tissues of healthy subjects is known to be normal distribution if the sample size is large enough, and its normal distribution can be defined by the mean value $\mu$ and standard deviation $\sigma$.

Accordingly, in the present embodiment, before machine learning using the teacher data is executed, the mean value $\mu$ and standard deviation $\sigma$ are calculated for each region of interest to identify the normal distribution state of the X-value for each region of interest using the aforementioned processing step for brain image data of healthy subjects obtained from the IXI database beforehand. By identifying these 290 pairs of mean values $\mu$ and standard deviation $\sigma$, it is possible to convert the X-values to z-values in machine learning and diagnosis assistance processing. The calculated mean values $\mu$ and standard deviation values $\sigma$ may be stored in the auxiliary storage device 11 etc.

Further, the z-value calculation unit 127' calculates the z-value from the X-value for each region of interest in the brain image of the ADNC patient based on the mean value $\mu$ and standard deviation $\sigma$ for each region of interest.

Specifically, the z-value is calculated by assigning the X-value, mean value μ, and standard deviation σ to the following equation:

$$z=(X-\mu)/\sigma$$

In step S26', the data including the regions of interest in the brain image of the ADNC patient and the z-values are associated with the diagnosis result D2 to generate teacher data D3'.

S2' shown in FIG. 16 is terminated by steps S21' to S26' described above. The generated teacher data D3' is stored in the auxiliary storage device 11, and steps S1' and S2' are repeated until the teacher data D3' is sufficiently stored in the auxiliary storage device 11 (YES in step S3).

Subsequently, in step S4, the first learning unit 131 learns a prediction algorithm D4' (SVMst) based on the teacher data D3' stored in the auxiliary storage device 11. In step S5, the second learning unit 132 performs additional learning by inputting scores of the Mini-Mental State Examination into the prediction algorithm D4' to generate a prediction algorithm D5' (SVMcog).

Diagnosis Assistance Device

The form of disease determination using the learned prediction algorithm D4' is described below.

Figure 19:
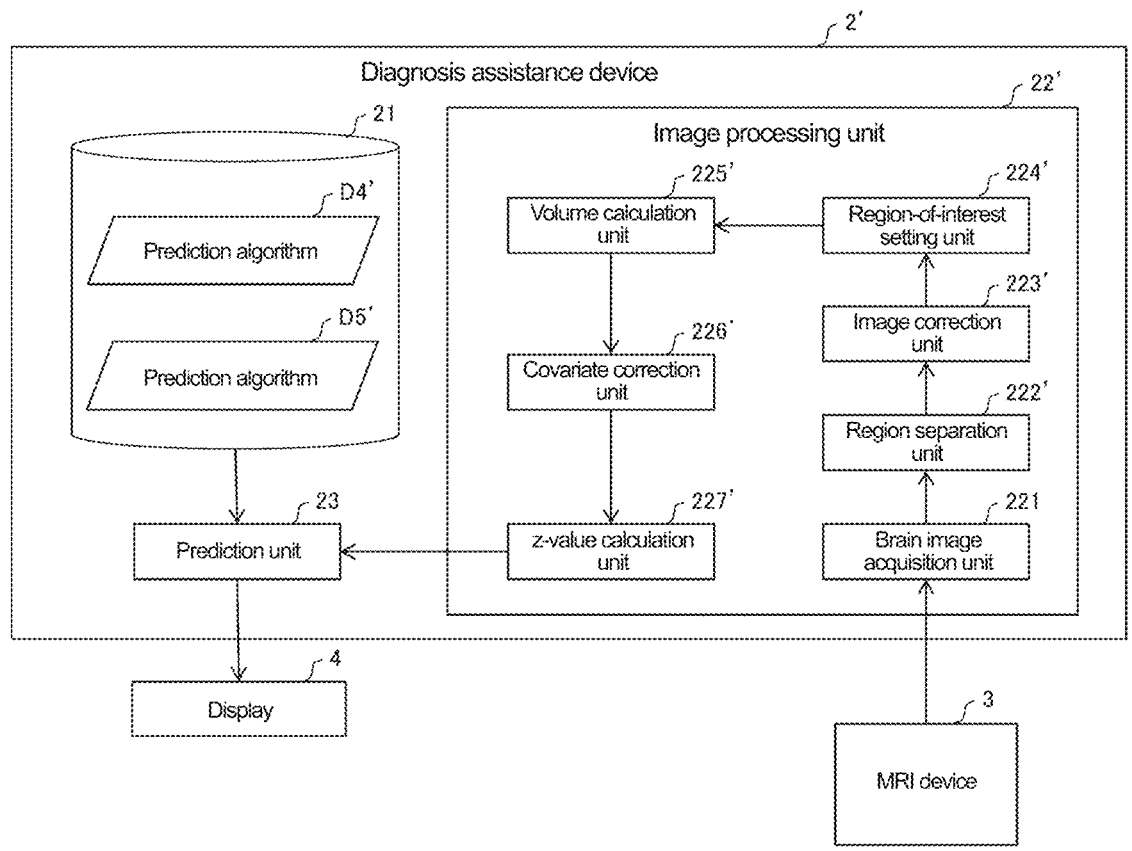
FIG. 19 is a block diagram showing the function of a diagnosis assistance device according to the second embodiment of the present invention.

FIG. 19 is a block diagram showing the function of a diagnosis assistance device 2' according to the present embodiment. The hardware configurations of the diagnosis assistance device 2' may be the same as those of the diagnosis assistance device 2 shown in FIG. 1.

The diagnosis assistance device 2' has the function of predicting the possibility that a subject will develop Alzheimer's disease within a prescribed period (e.g., within 5 years) (i.e., the possibility that the subject is ADNC spectrum), based on the brain image of the subject. In order to achieve this function, the diagnosis assistance device 2' comprises an image processing unit 22' and a prediction unit 23 as function blocks.

The image processing unit 22' separates gray matter from the brain image acquired from the outside, sets multiple regions of interest in the gray matter, performs arithmetic processing, such as calculation of z-values of the regions of interest, and outputs the z-value of each region of interest to the prediction unit 23. In order to generate the z-value of each region of interest, the image processing unit 22' comprises a brain image acquisition unit 221, a region separation unit 222', an image correction unit 223', a region-of-interest setting unit 224', a volume calculation unit 225', a covariate correction unit 226', and a z-value calculation unit 227'. These function blocks have the same functions as the brain image acquisition unit 121, region separation unit 123', region-of-interest setting unit 124', volume calculation unit 125', covariate correction unit 126', and z-value calculation unit 127' of the teacher data generation unit 12' shown in FIG. 15.

The brain image of the subject is acquired by the brain image acquisition unit 221. Thereafter, each of the region separation unit 223' to the z-value calculation unit 227' performs the processing of steps S21' to S26' shown in FIG. 17 to generate z-values of the regions of interest in the gray matter.

The prediction unit 23 predicts the possibility that the subject is ADNC spectrum, according to the prediction algorithm D4'. In the present embodiment, the prediction unit 23 predicts the possibility that the subject is ADNC spectrum, based on the z-value of each region of interest generated by the image processing unit 22'. The prediction result is displayed, for example, on a display 4 connected to the diagnosis assistance device 2'.

After the diagnosis result of the subject is obtained, the brain image data of the subject may be associated with the diagnosis result to generate teacher data, and the teacher data may be used for relearning. This can increase the prediction accuracy of the prediction algorithm as time advances.

EXAMPLES

Examples of the present invention are described below; however, the present invention is not limited to the following Examples.

Example 1

In Example 1, the North American ADNI database (NA-ADNI) was used as the diagnosis information database DB shown in FIG. 2. The present inventor extracted 1314 cases with existence of MRI brain image data from the NA-ADNI. The breakdown of the cases was as follows: 359 AD patients, 412 MCI patients, and 543 healthy subjects (NL). Among the MCI patients, 284 pMCI patients progressed to AD during follow-up, and 128 sMCI patients could be followed up for over 4 years with no progression to AD.

645 cases randomly extracted from the above 1314 cases were used as teacher data, and the prediction algorithm D4 (SVMst) of FIG. 2 was learned based on the teacher data D3. Similarly, MMSE sores were input into the prediction algorithm D4 to generate the prediction algorithm D5 (SVMcog) of FIG. 2.

The possibility that the subject would be ADNC spectrum was predicted by SVMst and SVMcog using the above teacher data as evaluation data. Specifically, accuracy (Accuracy), sensitivity (Sensitivity), specificity (Specificity), positive predictive value (PPV), negative predictive value (NPV), F1 value, Matthews correlation coefficient (MCC), relative risk (Relative risk), odds after diagnosis (Odds), and area under the curve (AUC; the area of a part under the ROC curve, ranging from 0 to 1. Values closer to 1 indicate higher discrimination ability. When the discrimination ability is random, AUC=0.5) were calculated as indicators of prediction accuracy. The results are shown in Table 1.

TABLE 1

|  | SVMst | SVMcog |
|---|---|---|
| Accuracy (%) | 91.3 | 93.3 |
| Sensitivity (%) | 93.3 | 92.4 |
| Specificity (%) | 89.4 | 94.1 |
| PPV(%) | 89.5 | 93.8 |
| NPV(%) | 93.2 | 92.7 |
| F1(%) | 91.4 | 93.1 |
| MCC(%) | 82.7 | 86.6 |
| Relative risk | 13.2 | 12.9 |
| Odds | 117.8 | 194.6 |
| AUC | 0.9595 | 0.9736 |

The above results revealed that the possibility of ADNC spectrum could be predicted with high accuracy by using the prediction algorithms D4 and D5 of Example 1.

Example 2

In Example 2, it was evaluated whether the prediction algorithm D4 (SVMst) and prediction algorithm D5 (SVMcog) generated in Example 1 were over-learned. Specifically, 669 cases out of the above 1314 cases of the NA-ADNI, except for the 645 cases extracted in Example 1, were used as evaluation data to calculate the prediction accuracy of the possibility that the subject would be ADNC spectrum. The prediction algorithm disclosed in PTL 1 (VSRAD) was also prepared as a comparative example, and the prediction accuracy of VSRAD was similarly calculated. The results are shown in Table 2.

TABLE 2

|  | SVMst | SVMcog | VSRAD |
|---|---|---|---|
| Accuracy (%) | 89.0 | 91.6 | 78.6 |
| Sensitivity (%) | 84.7 | 89.1 | 78.3 |
| Specificity (%) | 93.1 | 94.0 | 78.9 |
| PPV(%) | 92.0 | 93.3 | 77.8 |
| NPV(%) | 86.6 | 90.2 | 79.4 |
| F1(%) | 88.2 | 91.2 | 78.0 |
| MCC(%) | 78.2 | 83.3 | 57.2 |
| Relative risk | 6.8 | 9.5 | 3.8 |
| Odds | 74.2 | 128.0 | 13.5 |
| AUC | 0.9420 | 0.9681 | 0.8498 |

The results demonstrated that the learned prediction algorithms D4 and D5 were not over-learned, and that their prediction accuracy was higher than that of VSRAD.

Example 3

In Example 3, the prediction accuracy of the possibility of AD was evaluated for the prediction algorithm D4 (SVMst) generated in Example 1. Specifically, in addition to the NA-ADNI, data extracted from the Japanese ADNI database (JADNI) and the Australian ADNI database (AIBL) were also used as evaluation data. VSRAD disclosed in PTL 1 was also prepared as a comparative example, and the same data as the teacher data of Example 1 was analyzed by VSRAD to calculate the prediction accuracy of the learned VSRAD. Table 3 shows the results, including the breakdown of AD and NL in the NA-ADNI, JADNI, and AIBL.

TABLE 3

|  | SVMst | | | VSRAD | | |
|---|---|---|---|---|---|---|
| Database | NA-ADNI | AIBL | JADNI | NA-ADNI | AIBL | JADNI |
| AD/NL | 176/269 | 72/448 | 148/152 | 359/543 | 72/448 | 148/152 |
| Accuracy (%) | 89.4 | 91.5 | 87.3 | 80.4 | 73.0 | 79.5 |
| Sensitivity (%) | 77.8 | 90.3 | 85.1 | 80.5 | 79.2 | 89.3 |
| Specificity (%) | 97.0 | 91.7 | 89.5 | 80.3 | 72.0 | 69.9 |
| PPV(%) | 94.5 | 63.7 | 83.7 | 73.0 | 31.3 | 74.3 |
| NPV(%) | 87.0 | 98.3 | 83.2 | 86.2 | 95.5 | 87.0 |
| F1(%) | 85.4 | 74.7 | 86.9 | 76.6 | 44.9 | 81.1 |
| MCC(%) | 78.1 | 71.3 | 74.7 | 60.0 | 37.1 | 60.2 |
| Odds | 114.6 | 103.1 | 48.7 | 16.8 | 9.79 | 19.34 |
| AUC | 0.9450 | 0.9506 | 0.9453 | 0.8612 | 0.8423 | 0.7960 |

From the results, the learned prediction algorithm D4 showed higher prediction accuracy also in the prediction of the possibility of AD, in comparison with the conventional prediction algorithm. In addition, the prediction algorithm D4 showed a similar degree of prediction accuracy even in the evaluation of the data extracted from the multiple databases other than the database used as the teacher data, demonstrating that this algorithm was highly versatile.

Example 4

In Example 4, the prediction accuracy of the possibility of developing AD within a prescribed period in the presymptomatic stage of ADNC spectrum was examined for the prediction algorithm D4 (SVMst) and prediction algorithm D5 (SVMcog) generated in Example 1, and the prediction algorithm (VSRAD) disclosed in PTL 1. The results are shown in Table 4. As a result, in the positive case in VSRAD, the relative risk of developing AD in the future was 1.9 times higher than the negative case, whereas those in SVMst and SVMcog were 3.5 times and 3.6 times, respectively. This revealed that when the subject was predicted to be ADNC spectrum by the prediction algorithms D4 and D5, the risk of developing AD was 3.5 to 3.6 times higher than when the subject was not predicted to be ADNC spectrum.

TABLE 4

|  | SVMst | SVMcog | VSRAD |
|---|---|---|---|
| Accuracy (%) | 86.5 | 87.0 | 72.0 |
| Sensitivity (%) | 83.9 | 84.7 | 70.8 |
| Specificity (%) | 92.1 | 92.1 | 74.6 |
| PPV(%) | 95.8 | 95.9 | 85.8 |
| NPV(%) | 72.5 | 73.4 | 54.0 |
| F1(%) | 89.5 | 89.9 | 77.6 |
| MCC(%) | 72.1 | 72.9 | 42.5 |
| Relative risk | 3.5 | 3.6 | 1.9 |
| AUC | 0.9271 | 0.9313 | 0.7865 |

The above results revealed that the possibility that ADNC patients would develop Alzheimer's disease within a prescribed period could be predicted with high accuracy by using the diagnosis assistance device (diagnosis assistance method) of Example 2.

Example 5

In Example 5, the prediction accuracy of the possibility of AD by the prediction algorithm D4 (SVMst) generated in Example 1 was compared with that of two radiologists with an experience of over 20 years. Specifically, 100 cases of AD and 100 cases of NL (200 cases in total) were randomly extracted from the NA-ADNI database. Further, MRI brain images of AD and MRI brain images of NL (10 cases each) were presented to the radiologists to learn the diagnosis methods of AD and NL. After a few days, the radiologists were asked to diagnose whether the above 200 cases, including the already presented 20 cases, were AD or NL, then the results of VSRAD were presented, and the radiologists were asked again for diagnosis. In addition, using the above 200 cases as evaluation data, the possibility of AD or NL was predicted by the prediction algorithm D4, and its prediction accuracy was calculated. Table 5 shows the comparison between the diagnosis accuracy of the two radiologists and the prediction accuracy of the prediction algorithm D4.

TABLE 5

|  | Radiologist 1 | | Radiologist 2 | | |
|---|---|---|---|---|---|
| VSRAD assistance | No assistance | With assistance | No assistance | With assistance | SVMst |
| Accuracy (%) | 57.5 | 70.0 | 70.0 | 73.0 | 90.5 |
| Sensitivity (%) | 57.9 | 69.2 | 70.4 | 76.1 | 97.6 |
| Specificity (%) | 57.1 | 70.8 | 69.6 | 70.5 | 85.2 |
| PPV (%) | 55 | 72 | 69 | 67 | 83 |
| NPV(%) | 60 | 68 | 71 | 79 | 98 |
| F1 (%) | 56.4 | 70.6 | 69.7 | 71.3 | 89.7 |
| MCC (%) | 15.0 | 40.0 | 40.0 | 46.3 | 81.9 |
| Odds | 1.8 | 5.5 | 5.4 | 7.6 | 239.2 |

From the above results, for example, the radiologists under the assistance of VSRAD showed a diagnosis accuracy of 70% and 73%, whereas SVMst showed a prediction accuracy of 90.5%. Thus, the prediction accuracy of SVMst was clearly higher than the diagnosis accuracy of the radiologists.

Example 6

In Example 6, it was examined whether the deposition of brain amyloid-β could be predicted by the diagnosis assistance device (diagnosis assistance method) according to the present invention. Regarding the criteria for the presence or absence of brain amyloid-β deposition, an amyloid-β value of 192 pg/ml or less in the spinal fluid in the NA-ADNI database was defined as positive (present). In the NA-ADNI database, 415 cases were diagnosed as ADNC spectrum by the prediction algorithm D4 (SVMst) of Example 1, and 90.6% (376 cases) thereof was positive regarding brain amyloid-β deposition. From this, it can be assumed that the diagnosis assistance device (diagnosis assistance method) according to the present invention accurately understood the pathological conditions of AD.

Example 7

Figure 20:
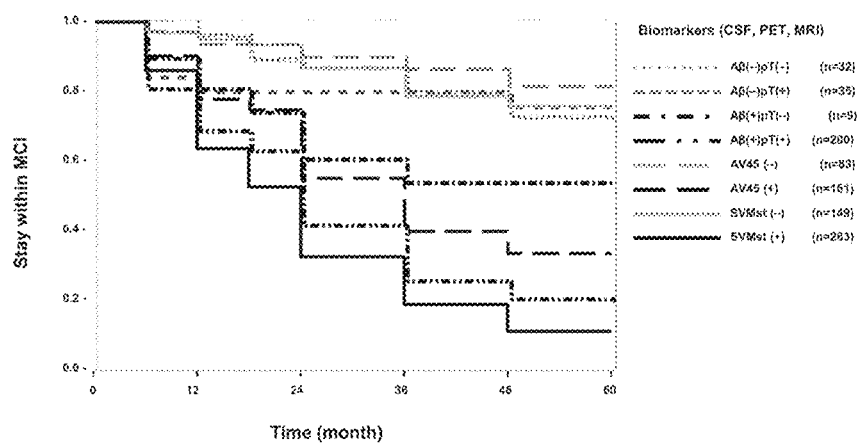
FIG. 20 is a graph showing the relationships between the number of months elapsed and the ratio of developing AD in groups classified by spinal fluid tests, prediction results by prediction algorithms, etc.

In Example 7, to what extent the prediction algorithm D4 (SVMst) of Example 1 could predict AD development within a prescribed period was examined using the progression-free survival curve. The targets were pMCI and sMCI cases in the NA-ADNI database. Of these cases, those who underwent biomarker measurement in spinal fluid tests, and AV-45 (amyloid PET) tests were selected. FIG. 20 shows the number of subjects (n) in each group and the relationship between the number of months elapsed and the ratio of developing AD. A(+) and pT(+) indicate that the spinal fluid biomarkers of amyloid-β and phosphorylated protein are positive, respectively.

Table 6 shows the hazard ratio in each biomarker and its confidence intervals. tT(+) indicates that the spinal fluid biomarker of tau protein was positive. ADNC is a group with A(+) and pT(+), and is assumed to have pathological AD clinical conditions. The hazard ratio of ADNC with A(+) and pT(+) was 2.18, whereas the hazard ratio of the case predicted to be positive by the prediction algorithm D4 (SVMst) of Example 1 was 3.59, indicating that there was a higher risk of developing AD than ADNC patients.

TABLE 6

|       | Level 1    | /Level 2   | Hazard Ratio | Lower 95% | Upper 95% |
|-------|------------|------------|--------------|-----------|-----------|
| MRI   | SVMst (+)  | SVMst (−)  | 3.59         | 2.87      | 4.49      |
|       | VSRAD(+)   | VSRAD(−)   | 1.86         | 1.52      | 2.28      |
| AV-45 | AV-45(+)   | AV-45(−)   | 1.98         | 1.51      | 2.59      |
| CSF   | A(+)       | A(−)       | 2.12         | 1.60      | 2.81      |
|       | tT(+)      | tT(−)      | 1.78         | 1.39      | 2.27      |
|       | pT(+)      | pT(−)      | 1.70         | 1.21      | 2.37      |
|       | A(+)pT(+)  | A(−)pT(−)  | 2.18         | 1.49      | 3.18      |
|       | A(+)pT(+)  | A(−)pT(+)  | 2.17         | 1.51      | 3.14      |
|       | A(+)pT(−)  | A(−)pT(−)  | 1.41         | 0.67      | 2.95      |
|       | A(+)pT(+)  | A(+)pT(−)  | 1.55         | 0.79      | 3.02      |
|       | A(−)pT(+)  | A(−)Tp(−)  | 1.00         | 0.62      | 1.62      |

REFERENCE SIGNS LIST

1: machine learning device
1': machine learning device
11: auxiliary storage device
12: teacher data generation unit
12': teacher data generation unit
121: brain image acquisition unit
122: region segmentation unit
122': region separation unit
123: image correction unit
123': image correction unit
124: region-of-interest setting unit
124': region-of-interest setting unit
125: volume calculation unit
125': volume calculation unit
126: t-value and p-value calculation unit
126': covariate correction unit
127: z-value calculation unit
127': z-value calculation unit
128: diagnosis result acquisition unit
13: learning unit
131: first learning unit
132: second learning unit
2: diagnosis assistance device
2': diagnosis assistance device
21: auxiliary storage device
22: image processing unit
22': image processing unit
221: brain image acquisition unit
222: region segmentation unit
222': region separation unit
223: image correction unit
223': image correction unit
224: region-of-interest setting unit
224': region-of-interest setting unit
225: volume calculation unit
225': volume calculation unit
226: t-value and p-value calculation unit
226': covariate correction unit
227: z-value calculation unit
227': z-value calculation unit
23: prediction unit
3: MRI device
4: display
D1: brain image
D1': brain image
D2: diagnosis result
D2': diagnosis result
D3: teacher data
D3': teacher data
D4: prediction algorithm
D4': prediction algorithm
D5: prediction algorithm
D5': prediction algorithm
DB: diagnosis information database

The invention claimed is:

1. A diagnosis assistance device predicting a possibility that a subject who has Alzheimer's disease neuropathologic change will develop Alzheimer's disease within a prescribed period, the diagnosis assistance device comprising:
   a prediction unit that predicts the possibility according to a machine-learned prediction algorithm;
   a region segmentation unit that segments a brain image acquired from the subject into gray matter, white matter, and a spinal fluid part, and separates the lateral ventricle from the spinal fluid part;
   a region-of-interest setting unit that sets multiple regions of interest in each of the gray matter, the white matter, and the lateral ventricle;

a t-value and p-value calculation unit that calculates t- and p-values in each region of interest for the volume of each region of interest; and a z-value calculation unit that calculates a z-value of each region of interest based on the t- and p-values, wherein the prediction unit predicts the possibility based on the z-values.

2. The diagnosis assistance device according to claim 1, wherein the region segmentation unit determines a boundary between the corpus callosum and surrounding white matter by surface tension and viscosity parameters of a fluid to thereby separate the surrounding white matter.

3. The diagnosis assistance device according to claim 1, wherein when a white matter lesion is present in the white matter, the region-of-interest setting unit extracts the white matter lesion, replaces it with an average signal value of the white matter of the subject, and then sets the regions of interest in the white matter.

4. The diagnosis assistance device according to claim 1, wherein the prediction unit predicts the possibility as a posterior probability from the distance to a hyperplane by a sigmoid function.

5. A machine learning device for learning the machine-learned prediction algorithm according to claim 1, the machine learning device comprising a learning unit that learns the machine-learned prediction algorithm based on teacher data generated from brain images of multiple persons, and diagnosis results indicating whether each person has developed Alzheimer's disease before the end of the prescribed period from the acquisition of the brain image.

6. The machine learning device according to claim 5, wherein the learning unit is configured from a support vector machine.

7. The machine learning device according to claim 5, wherein the brain images are MRI images.

8. The machine learning device according to claim 5, further comprising a teacher data generation unit that generates the teacher data based on the brain images of multiple persons and the diagnosis results indicating whether each person has developed Alzheimer's disease before the end of the prescribed period from the acquisition of the brain image.

9. The machine learning device according to claim 8, wherein the teacher data generation unit comprises:

a second region segmentation unit that segments each of the brain images acquired from the persons into gray matter, white matter, and a spinal fluid part, and separates the lateral ventricle from the spinal fluid part;

a second region-of-interest setting unit that sets multiple regions of interest in each of the gray matter, the white matter, and the lateral ventricle;

a second t-value and p-value calculation unit that calculates t- and p-values in each region of interest for the volume of each region of interest; and a second z-value calculation unit that calculates a z-value of each region of interest based on the t- and p-values, wherein the teacher data includes the diagnosis results and the z-values.

10. The machine learning device according to claim 8, wherein the teacher data generation unit comprises:

a region separation unit that separates gray matter from each of the brain images acquired from the persons;

a second region-of-interest setting unit that sets multiple regions of interest in the gray matter;

a volume calculation unit that calculates the volume of each region of interest; and a second z-value calculation unit that calculates a z-value of each region of interest based on the volume, wherein the teacher data includes the diagnosis results and the z-values.

11. The machine learning device according to claim 10, further comprising a covariate correction unit that performs covariate correction on the volume.

12. A machine learning method for learning the machine-learned prediction algorithm according to claim 9, the method comprising a learning step of learning the machine-learned prediction algorithm based on teacher data generated from brain images of multiple persons and diagnosis results indicating whether each person has developed Alzheimer's disease before the end of the prescribed period from the acquisition of the brain image.

13. A diagnosis assistance method for predicting a possibility that a subject who has Alzheimer's disease neuropathologic change will develop Alzheimer's disease within a prescribed period, the method comprising:

separating gray matter from a brain image acquired from the subject;

setting multiple regions of interest in the gray matter;

calculating the volume of each region of interest;

calculating a z-value of each region of interest based on the volume; and predicting the possibility based on the z-values according to a machine-learned prediction algorithm.

14. A diagnosis assistance device predicting a possibility that a subject who has Alzheimer's disease neuropathologic change will develop Alzheimer's disease within a prescribed period, the diagnosis assistance device comprising:

a prediction unit that predicts the possibility according to a machine-learned prediction algorithm;

a region separation unit that separates gray matter from a brain image acquired from the subject;

a region-of-interest setting unit that sets multiple regions of interest in the gray matter;

a volume calculation unit that calculates the volume of each region of interest; and a z-value calculation unit that calculates a z-value of each region of interest based on the volume, wherein the prediction unit predicts the possibility based on the z-values.

15. The diagnosis assistance device according to claim 14, further comprising a covariate correction unit that performs covariate correction on the volume.

16. A non-transitory storage device including a machine learning program that causes a computer to learn the machine-learned prediction algorithm according to claim 13, wherein the machine learning program causes the computer to execute at least one step comprising:

learning the machine-learned prediction algorithm based on teacher data generated from brain images of multiple persons and diagnosis results indicating whether each person has developed Alzheimer's disease before the end of the prescribed period from the acquisition of the brain image.

17. A non-transitory storage device including an Alzheimer's prediction program that causes a computer to execute steps comprising:

a teacher data generation step of generating teacher data from brain images of multiple persons and diagnosis results indicating whether each person has developed Alzheimer's disease before the end of a prescribed period from the acquisition of the brain image, a learning step of learning a prediction algorithm based on the teacher data, and a prediction step of predicting, according to the prediction algorithm, a possibility that a subject who has Alzheimer's disease neuropathologic change will develop Alzheimer's disease within the prescribed period;
wherein the teacher data generation step comprises:
separating gray matter from the brain images acquired from the persons,
setting multiple regions of interest in the gray matter,
calculating the volume of each region of interest,
calculating a z-value of each region of interest based on the volume, and
associating the diagnosis results with the z-values to generate the teacher data; and
wherein the prediction step comprises:
separating gray matter from a brain image acquired from the subject,
setting multiple regions of interest in the gray matter,
calculating the volume of each region of interest,
calculating a z-value of each region of interest based on the volume, and
predicting the possibility based on the z-values.

* * * * *